（12） United States Patent
Dimov et al.

(10) Patent No.: US 10,274,660 B2
(45) Date of Patent: Apr. 30, 2019

(54) HOLOGRAPHIC SUBSTRATE-GUIDED WAVE-BASED SEE-THROUGH DISPLAY

(75) Inventors: Fedor Dimov, Redondo Beach, CA (US); Tin Aye, Mission Viejo, CA (US); Kevin Yu, Temple City, CA (US); Svetlana Soboleva, Torrance, CA (US); Khin Swe Yin, Alhambra, CA (US); Myo Kyaw, Rosemead, CA (US); Dmitry Voloschenko, Torrance, CA (US)

(73) Assignee: Luminit, LLC, Torrance, CA (US)

( * ) Notice: Subject to any disclaimer, the term of this patent is extended or adjusted under 35 U.S.C. 154(b) by 555 days.

(21) Appl. No.: 12/620,538

(22) Filed: Nov. 17, 2009

(65) Prior Publication Data

US 2010/0157400 A1 Jun. 24, 2010

Related U.S. Application Data

(60) Provisional application No. 61/115,419, filed on Nov. 17, 2008, provisional application No. 61/144,063, filed on Jan. 12, 2009.

(51) Int. Cl.
*G02B 5/32* (2006.01)
*G02B 27/01* (2006.01)
(Continued)

(52) U.S. Cl.
CPC .............. *G02B 5/32* (2013.01); *G02B 5/188* (2013.01); *G02B 27/0172* (2013.01); *G02B 6/00* (2013.01);
(Continued)

(58) Field of Classification Search
CPC .. G02B 5/1804; G02B 5/1814; G02B 5/1819; G02B 5/1866–5/188; G02B 5/32;
(Continued)

(56) References Cited

U.S. PATENT DOCUMENTS 5,966,223 A * 10/1999 Friesem et al. .................. 359/16
5,991,084 A * 11/1999 Hildebrand et al. .......... 359/629
(Continued)

OTHER PUBLICATIONS

Kogelnik, H. "Coupled Wave Theory for Thick Hologram Gratings," The Bell System Technical Journal, vol. 48, No. 9, (1969).
(Continued)

*Primary Examiner* — Derek S Chapel
(74) *Attorney, Agent, or Firm* — Husch Blackwell LLP

(57) ABSTRACT

A holographic substrate-guided wave-based see-through display has a microdisplay, capable of emitting light in the form of an image. The microdisplay directs its output to a holographic optical element, capable of accepting the image from the microdisplay, and capable of transmitting the light. The holographic optical element couples its output to an elongate substrate, capable of accepting the light from the holographic optical element at a first location, and transmitting the light along a length of the substrate by internal reflection to a second location, the elongate substrate being capable of transmitting the accepted light from the second location. The substrate couples out what it receives to a transparent holographic optical element, capable of accepting the light transmitted from the substrate and transmitting it to a location outside of the holographic optical element as a viewable image.

1 Claim, 17 Drawing Sheets

(51) Int. Cl.
*G02B 5/18* (2006.01)
*G02B 6/00* (2006.01)
*G02B 6/34* (2006.01)
*G03H 1/04* (2006.01)
*G03H 1/26* (2006.01)

(52) U.S. Cl.
CPC ........ *G02B 6/34* (2013.01); *G02B 2027/0174* (2013.01); *G03H 1/0408* (2013.01); *G03H 2001/0439* (2013.01); *G03H 2001/261* (2013.01); *G03H 2210/63* (2013.01); *G03H 2270/21* (2013.01)

(58) Field of Classification Search
CPC ...... G02B 27/017–27/0172; G02B 2027/0174; G02B 6/00; G02B 6/34; G03H 1/0408; G03H 2001/0439; G03H 2001/261; G03H 2210/63; G03H 2270/21
USPC .................. 359/1, 13–15, 19, 22–26, 32–34, 359/558–576, 618, 629–640; 345/7–9; 385/129–132
See application file for complete search history.

(56) References Cited

U.S. PATENT DOCUMENTS

| | | | |
|---|---|---|---|
| 6,169,613 B1 | 1/2001 | Amitai et al. | |
| 6,429,954 B1 | 8/2002 | Kasai | |
| 6,636,356 B2 | 10/2003 | Takeyama | |
| 6,721,075 B2 * | 4/2004 | Orr | G02B 5/0252 359/15 |
| 6,825,987 B2 | 11/2004 | Repetto et al. | |
| 6,829,095 B2 | 12/2004 | Amitai | |
| 7,006,266 B2 * | 2/2006 | Amitai | G02B 5/32 359/15 |
| 7,072,085 B2 | 7/2006 | Ouchi | |
| 7,181,108 B2 | 2/2007 | Levola | |
| 7,205,960 B2 * | 4/2007 | David | 345/7 |
| 7,418,170 B2 | 8/2008 | Mukawa et al. | |
| 7,420,733 B1 * | 9/2008 | Natarajan | G02B 5/32 349/201 |
| 7,453,612 B2 | 11/2008 | Mukawa | |
| 2001/0028309 A1 * | 10/2001 | Torch | 340/575 |
| 2004/0004767 A1 | 1/2004 | Song | |
| 2009/0190222 A1 | 7/2009 | Simmonds et al. | |

OTHER PUBLICATIONS

Upatnieks, J. "Compact Holographic Sight," Proc. SPIE, vol. 883, pp. 171-176 (1988).
Huang, Q. et al, "Diffraction Properties of Substrate Guided Wave Holograms," Optical Engineering, vol. 34, No. 10, p. 2891, (1995).
Cakmakci, O. et al, Head-Worn Displays: A Review, J. Display Technology, vol. 2(3), pp. 199-216 (2006).
Fowles, G.R. "Introduction to Modern Optics" p. 45, 2d ed., Dover Publications, Inc. (1975).
Feynman, R.P. et al, the Feynman Lectures on Physics, II-33-12f, Addison-Wesley (1965).

* cited by examiner

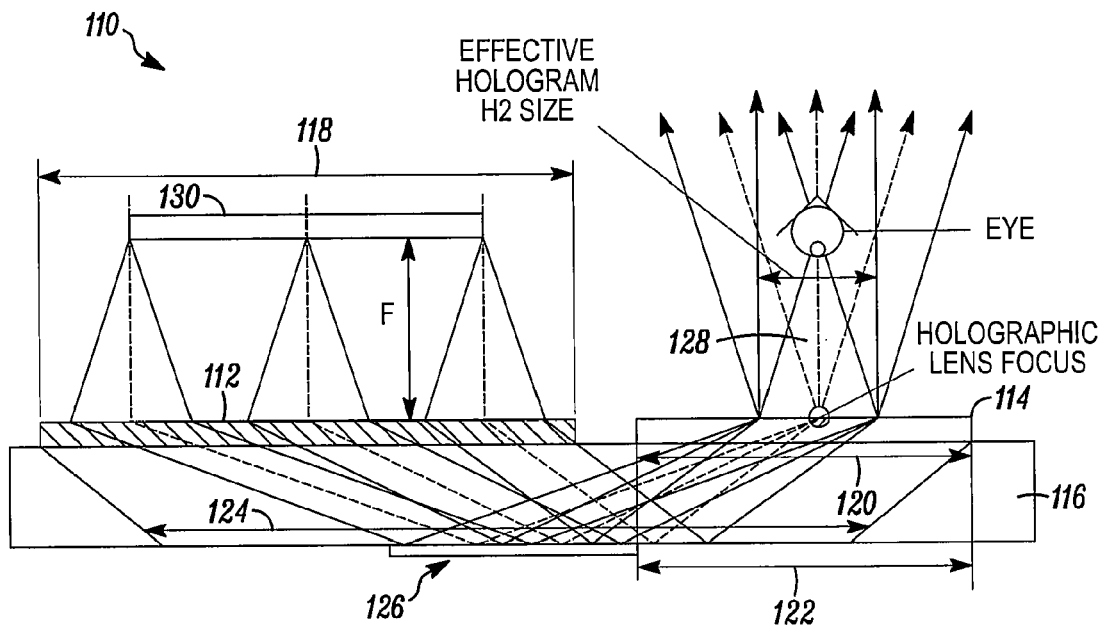
FIG. 1
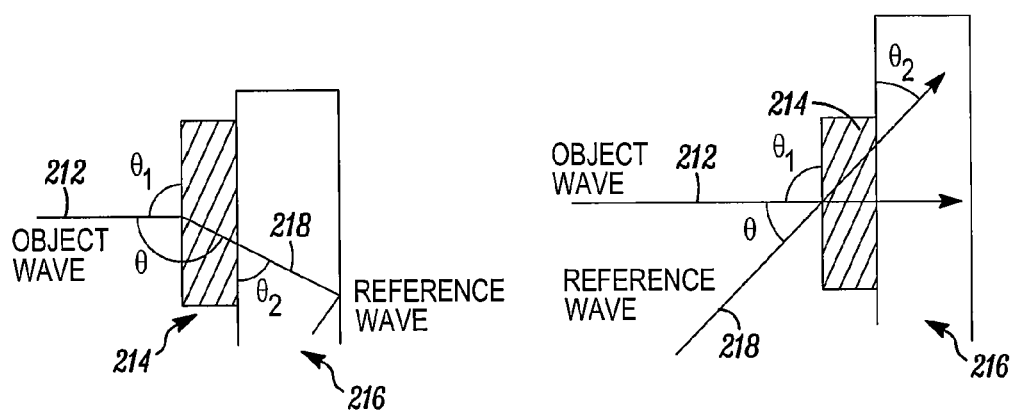
FIG. 2A                    FIG. 2B

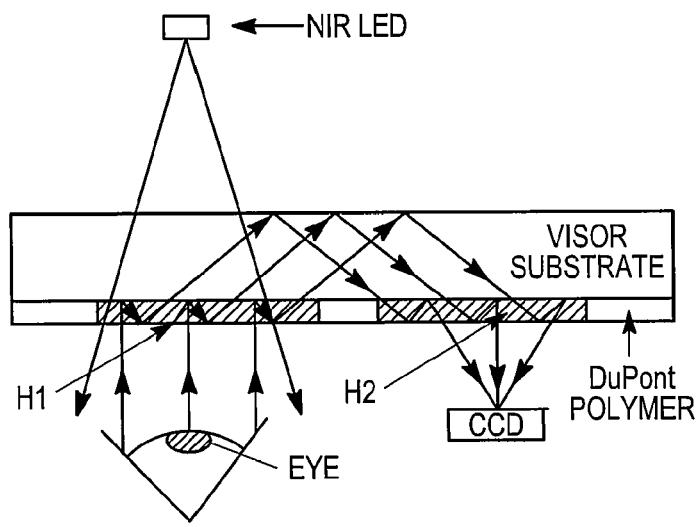
FIG. 26
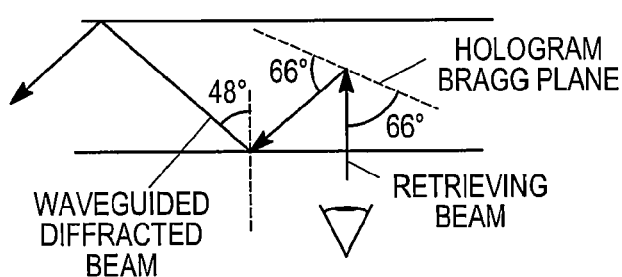
FIG. 27A
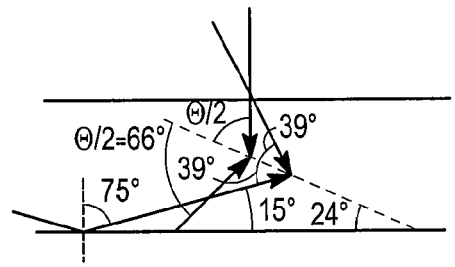
FIG. 27B
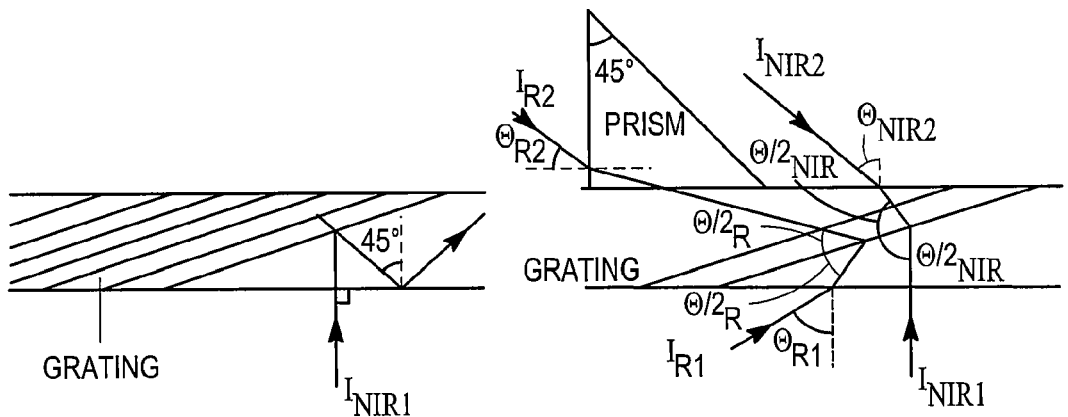
FIG. 28A
FIG. 28B

HOLOGRAPHIC SUBSTRATE-GUIDED WAVE-BASED SEE-THROUGH DISPLAY

This application claims the benefit of U.S. Provisional Application No. 61/115,419 filed Nov. 17, 2008 and U.S. Provisional Application No. 61/144,063 filed Jan. 12, 2009.

BACKGROUND OF THE INVENTION

Head-mounted and head-up displays for simulation, training, entertainment, and military applications have been in use for a number of years. They have a great potential for construction work, sports, space suit, medicine, education, mobile communications and for other fields. Substantial efforts are made to reduce size, weight, cost, and the number of optical and electronic elements of a display. Further efforts are made to improve brightness, contrast, and image quality.

A head-mounted display (HMD) can use a micro-display source such as a liquid crystal display (LCD) or liquid crystal on silicon (LCOS) with a backlight. An alternative is to use an organic light-emitting diode (OLED) display, reflective and/or refractive optics to create a magnified virtual image of the micro-display source for a viewer's eye(s). A number of opaque head-mounted displays have been developed.

But none of them has allowed users to see through to the real world, severely limiting possible applications. [O. Cakmakci, J. Rolland, *Head-Worn Displays: A Review*, J. Display Technology, Vol. 2(3), pp. 199-216 (2006)]. Partially see-through head-mounted displays exist. They use an optical combiner element in front of the viewer's eyes to allow for superposition of an external view with the virtual imagery. These partially-see-through head-mounted displays suffer from poor light transmission through the combiner resulting in a dim view of the outside world and decreased virtual image brightness.

There has been a long-felt need for a viable optical see-through head-mounted display offering minimization of the size of the optics. Using the display in combination with the environment would permit creating a synthetic environment that is a combination of the display image and the environment. See-through head-mounted displays can advantageously be deployed as goggles that are lightweight. Further it would be advantageous for them to provide with sufficient eye space (eye relief) to permit the wearing correction prescription glasses and have sufficient eye box to provide a full field-of-view (FOV) image at significant eye movements.

An edge-illuminated substrate holographic approach with a single hologram for see-through image creation was proposed J. Upatnieks, 'Compact Holographic Sight', Proc. SPIE, Vol. 883, pp. 171-176 (1988). Such approach indeed allowed for a see-through imagery with a simultaneous bright view of the outside world. But the image quality was poor, mostly because of the color dispersion created by a single hologram for a broad-band source. A single-hologram approach was followed by some developers. M. Simmonds, M. Valera, 'Projection Display' US Pat. Application 2009/0190222 A1 (43) (2009); T. Takeyama, 'Observation Optical system', U.S. Pat. No. 6,636,356 B2 (2003); Yu. Ouchi, 'Image Combiner and Image Display Unit', U.S. Pat. No. 7,072,085 B2 (2006); I. Kasai, 'Image Display Device', U.S. Pat. No. 6,429,954 B1 (2002). They used either a single laser source for LCD illumination thus not enabling the color imagery or proposed very complicated hologram recording geometries for generating aspheric recording wave-fronts which are rather complicated and costly to be implemented in practice.

Another approach uses diffractive elements placed on a transparent waveguide to create an enlarged see-through virtual image for a viewer. P. Repetto, E. Borello, S. Bernard, 'Light Guide for Display Devices of the Head-Mounted or Head-up Type', U.S. Pat. No. 6,825,987 B2 (2004); T. Levola, Method and Optical System for Coupling Light Into a Waveguide, U.S. Pat. No. 7,181,108 B2 (2007); Y-R. Song, 'Wearable Display System Adjusting Magnification of an Image', US Pat. Application US2004/0004767 A1 (2004). While providing a see-through capability, such an approach suffers from stray light generated by unwanted diffraction into undesired diffractive orders that substantially decreases the image quality and contrast.

Another approach uses partially reflective elements placed at some angle on a transparent waveguide. Ya. Amitai, 'Substrate-Guided Optical Beam Expander', U.S. Pat. No. 6,829,095 B2 (2004). While creating a see-through imagery, fabrication of such elements in mass quantities can be prohibitively expensive.

In an attempt to remove the color dispersion from the imagery, another approach was followed that uses two coupled holograms for a see-through image creation Y. Amitai, A. Friesem, I. Shariv, 'Planar Holographic Optical Device for Beam Expansion and Display', U.S. Pat. No. 6,169,613 B1 (2001); H. Mukawa, 'Optical Device and Virtual Image Display', U.S. Pat. No. 7,453,612 (2008); H. Mukawa, K. Akutsu, 'Optical Device and Virtual Image Display Device', U.S. Pat. No. 7,418,170 (2008). While providing a means to mostly remove the color dispersion from the imagery for the case when two identical holographic gratings are placed mirror-symmetrically on the waveguide, the actually achieved field-of-view was rather narrow (~15 deg). In addition, a path of creating such displays for curved substrates which, is needed for many applications was not outlined. Also, a desired reduction of the number of optical elements for such displays was not clarified.

There is therefore still a need for a display that uses a thin transparent waveguide that couples the light to the display in such a way as to create a wide field-of-view, aberration-free virtual image. It would be desirable for such a display to have a capability to provide a long (up to ~70-80 mm) eye relief. It would be also desirable for the technology for the display to be capable of execution on a curved waveguide substrate so that it can conform with the shape of a helmet employed in e.g., avionic and in other applications, to allow for the implementation of compact optics, to provide a highly-transparent (~90%) view of the outside world.

Embodiments of the invention can be used to evaluate surface mounted, portable or wearable gas detectors. Alternately, sensitivity parameters of various types of smoke detectors, or other types of detectors, can be evaluated. In yet another aspect of the invention, the hand held unit can communicate not only with the test device but also with an associated regional monitoring system.

We propose a display that uses a thin transparent waveguide with holographic elements enabling in-coupling and out-coupling of light to/from the waveguide in such a way as to create a wide field-of-view, aberration-free virtual image for a viewer, with a capability to provide a long (up to ~70-80 mm) eye relief, with a capability to be formed on a curved waveguide substrate, desirably conformal with the shape of a helmet employed in e.g., avionic and in other applications, to allow for the implementation of compact optics, to provide a highly-transparent (~90%) view of the outside world.

SUMMARY OF THE INVENTION

A holographic substrate-guided wave-based see-through display can has a microdisplay, capable of emitting light in the form of an image. The microdisplay directs its output to a holographic lens, capable of accepting the light in the form of an image from the microdisplay, and capable of transmitting the accepted light in the form of an image. The holographic lens couples its output to an elongate transparent substrate, capable of accepting the light in the form of an image from the holographic lens at a first location, and transmitting the light in the form of an image along a length of the substrate by total internal reflection to a second location spaced from the first location, the elongate substrate being capable of transmitting the accepted light in the form of an image at the second location. The substrate couples out what it receives to a transparent holographic grating, capable of accepting the light transmitted from the elongate substrate and transmitting it to a location outside of the holographic grating as a viewable image.

Another aspect of the invention can have a second microdisplay, capable of emitting light in the form of an image. This second microdisplay can send its output to a second holographic lens, capable of accepting the light in the form of an image from the microdisplay, and capable of transmitting the accepted light in the form of an image. This second holographic lens can send its output to the elongate transparent substrate, capable of accepting the light in the form of an image from the second holographic lens at a third location, and transmitting the light in the form of an image along a length of the substrate by total internal reflection to the second location, the elongate substrate being capable of transmitting the accepted light in the form of an image at the second location. The transparent holographic grating, capable of accepting the light transmitted by the elongate substrate from the second holographic lens and transmitting it to the location outside of the holographic grating as a viewable image. Advantageously, the two microdisplays can send partial images in cooperation to increase the viewing area or quality of the total display.

As an alternative the holographic substrate-guided wave-based see-through display can use a holographic lens instead of a holographic grating to handle the final output of the image.

The invention also contemplates a light source positioned to illuminate the reflective area. In that case a holographic lens, capable of accepting light reflected by the area in the form of an image from the area, and capable of transmitting the accepted light in the form of an image of the illuminated reflective area. In turn, the image of the area is sent to an elongate transparent substrate, capable of accepting the light in the form of an image from the holographic lens at a first location, and transmitting the light in the form of an image along a length of the substrate by internal reflection to a second location spaced from the first location, the elongate substrate being capable of transmitting the accepted light in the form of an image at the second location. The substrate then brings the image of the illuminated area to a transparent holographic grating, capable of accepting the light transmitted from the elongate substrate and transmitting it to a location outside of the holographic grating as a viewable image. The grating directs the light to a camera, capable of accepting light bearing an image from the holographic grating, the camera being capable of continuously or intermittently recording the transmitted image of the reflective area.

In another aspect of the invention, the monitoring and display functions can be present in the same object. In that case, in addition to the monitoring elements, the display has a first microdisplay, capable of emitting light in the form of a first image and a second microdisplay, capable of emitting light in the form of a second image. The display has a corresponding a second holographic lens, capable of accepting the light in the form of the image from the first microdisplay, and capable of transmitting the accepted light in the form of the first image and a third holographic lens, capable of accepting the light in the form of the second image from the second microdisplay, and capable of transmitting the accepted light in the form of the second image. In that event the elongate transparent substrate, capable of accepting the first and second images from the microdisplays that have been conveyed to the holographic lenses at a third location and a fourth location, and transmitting the light in the form of an image along a length of the substrate by internal reflection to a fifth location spaced from the first through fourth locations, the elongate substrate being capable of transmitting the accepted light in the form the first and second images from the microdisplays from their respective locations. The substrate outputs the microdisplay images to a transparent holographic grating located at the fifth location, capable of accepting the light transmitted from the elongate substrate at the third and fourth locations and transmitting it to a location outside of the holographic grating as a viewable image.

The benefits and advantages of the invention will be apparent to the skilled worker from the discussion that follows.

BRIEF DESCRIPTION OF DRAWINGS

In the drawings, which form a portion of this disclosure, the drawings are:

FIG. 1, a diagram of optical portions of one operative holographic substrate-guided wave-based see-through display.

FIG. 2, a diagram of two recording geometries for recording substrate-guided holograms.

FIG. 26 is an illustration of how an eye can be monitored with near infrared light according to the invention.

FIG. 27 shows diffraction by a reflection hologram and its coupling into the waveguide as well as the recording geometry for a reflection hologram at 647 nm.

FIG. 28 shows the reconstruction of a hologram and a recording of a hologram for use with infrared light.

DETAILED DESCRIPTION OF THE INVENTION

Figure 3:
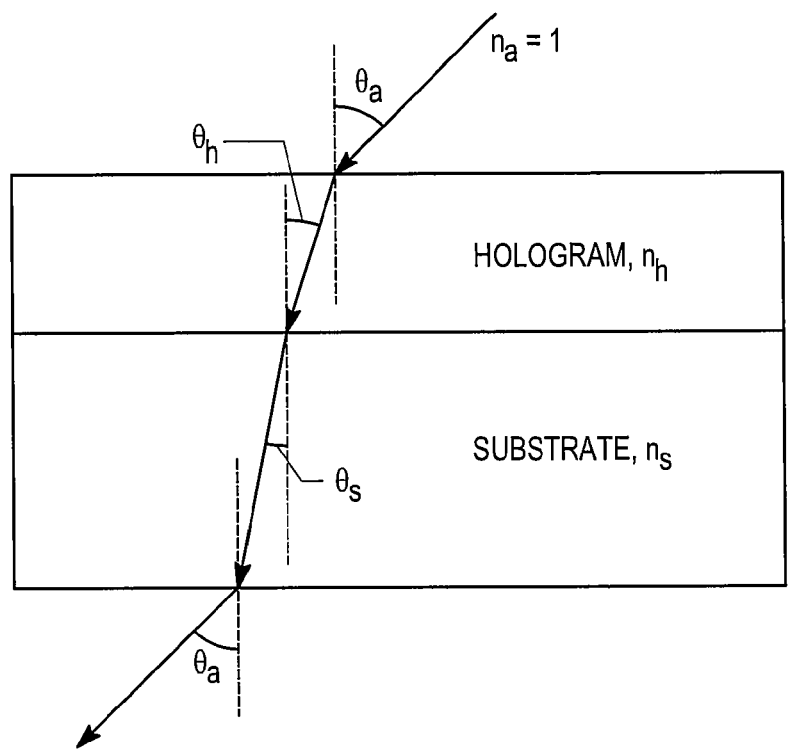
FIG. 3 is a diagram showing the beam propagation from the air into a hologram, from the hologram into a substrate, and then from the substrate into the air.

Although the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

It is to be further understood that the title of this section of the specification, namely, "Detailed Description of the Invention" relates to a rule of the United States Patent and Trademark Office, and is not intended to, does not imply, nor should be inferred to limit the subject matter disclosed herein or the scope of the invention.

What follows is a successful design for head-mounted display based on Substrate-Guided Wave (SGW) holograms, with the optical parameters comparable to head-mounted display based on common optics, with performance in terms of see-through capability, brightness, weight, and cost that exceeds present head-mounted display displays that are based on common optics.

Referring to FIG. 1 a Substrate-guided wave-based Holographic See-through Display (SHSD) 110 consists of a first hologram $H_1$ 112 and a second hologram $H_2$ 114 laminated to a substrate 116 that is substantially transparent in at least a portion thereof, but may also be entirely transparent.

The substrate 116, or plate, can be made from a number of materials. For example, the transparent portions of the plate 116 can be made of at least glass, polycarbonate plastic or acrylic plastic. Such a plate 116 is at least operative when having a thickness of the 3-6 mm, but can also be operative at other thicknesses. The external surface of the plate 116 should have a first transparent region 118 (from image source side only, other side can be opaque in the first region, depending on required see-through FOV) for accepting a transmitted image, a second transparent region 120 for transmitting the accepted image, and a third viewing region 122 that permits viewing through the entire plate, and a transparent volume 124 throughout the substrate along the entire path from where the transmitted image is accepted to where the accepted image is transmitted. All of the transparent regions may overlap with each other, and the substrate is not restricted from having transparent regions or volumes that are larger than mentioned.

The substrate 116 is depicted in the figures as a single, unitary body of a single material. However, the substrate 116 may also comprise a plurality of bodies made of a single or a plurality of materials. A person of ordinary skill in the art will be capable of using ray-tracing software to determine whether the particular configuration of materials and bodies will serve to transmit the accepted image to where it can be transmitted to a viewer.

The substrate 116 as depicted is an uncoated unitary body. As such, the accepted image is conveyed to the region 120 where the image is transmitted out of the substrate 116. This conveyance may be done directly, without internal reflections by the accepted image being conveyed to the transmission area in a straight line. This conveyance may also be done by internal reflections. One way to achieve internal reflection is to coat the substrate at the locations where reflection is required with a reflective material, many of which are known to those of ordinary skill in the art. An evaporated layer of silver is an example of a coating 126, although the reflective layer may be applied by any means and may be of any composition that is functional.

Another way to achieve internal reflection is by total internal reflection (TIR). In this case, the substrate must either have an index of refraction, relative to the environmental medium, sufficient to internally reflect the light of the accepted image. For example, in space, the index of refraction is very close to 1; in air the index of refraction is about 1.00025 to 1.00030; and in water the index of refraction is about 1.33. Those of ordinary skill in the art will be able to calculate an angle of total internal reflection. E.g. Grant R. Fowles, "Introduction to Modern Optics" p. 45 (2d ed. 1975); R. Feynman, R. Leighton and M. Sands, The Feynman Lectures On Physics, II-33-12f (1965). Examples of high-index of refraction materials capable of total internal reflection with many media are polycarbonate plastic, acrylic plastic, quartz or crown glass (all about 1.5-1.6) or flint glasses (about 1.5 to 2.0). Total internal reflection is especially preferred for reflections that occur near the portion of the substrate 116 where the accepted image is transmitted out of the substrate 116.

Transparent means that the substrate 116 is capable of permitting light through sufficient to allow a human being to receive and interpret the image. Accordingly, the substrate 116 may be tinted or have other modifications that do not render the device inoperative. For example, any material will have some amount of diffusion from imperfections or inclusions, but the diffusion should not be so great as to prevent the acceptance, conveyance, and transmission of the image by the substrate 116.

Referring further to FIG. 1, the first transparent region 118 (accepting a transmitted image) faces first hologram H1 112; the second transparent region 120 (transmitting the accepted image) faces second hologram H2 114; The third transparent region is at least as large as the field of view 128 and includes the surfaces on both sides of the substrate and the volume in between.

The first and second holograms 112 & 114 can be laminated either on the same side of the substrate, or on different sides. Holograms $H_1$ and $H_2$ in fact are holographic optical elements (HOE), either or both of them can have optical power. The preferred embodiment has at least one with optical power.

In one embodiment, first hologram $H_1$ 112 has optical power. As such, first hologram $H_1$ 112 is a holographic lens. In that embodiment, lacking optical power, second hologram $H_2$ 112 is holographic grating.

Distinctive feature of these holograms is their capability to couple the light in the substrate at angles larger than or equal to total internal reflection (TIR) angle of the substrate, and to out-couple the light that propagates along the substrate.

Another distinctive feature of these holograms 112, 114 is that they are Bragg holograms. This means that they diffract the light in single diffraction order. Hence their diffraction efficiency can be very high (theoretically 100%). This results in very high light throughput of the optical system (theoretically 100%). Contrary to this other see-through displays based on beam combiners (semitransparent or dichroic mirrors) have much smaller light throughput.

The substrate-guided wave-based holographic see-through display 110 works by using substrate-guided wave (SGW) holograms. Some basic information about SGW holograms and theory developed is presented in H. Qiang and J. A. Gilbert, "Diffraction Properties of Substrate Guided Wave Holograms," Optical Engineering, vol. 34, no. 10, p. 2891, 1995, and the general explanations the follow were inspired by Qiang. It is based on Kogelnik's coupled wave theory. H. Kogelnik, "Coupled Wave Theory for Thick Hologram Gratings," The Bell System Technical Journal, vol. 48, no. 9, 1969.

The actual recording geometry can differ significantly from that drawn in FIG. 2, but in general terms the features are the same. Referring to FIG. 2(a), reflection SGW holograms are recorded with two beams: the first of them (the object beam) 212 hits the recording medium 214 at a normal (or close to normal) angle $\Theta_1$ from a one side of the interface between the recording medium 214 and an outside medium 216; the second of the two beams (the reference wave) 218 hits the recording medium at a shallow angle $\Theta_2$ from the opposite side of the interface between the recording medium 214 and the outside medium 216.

Referring to FIG. 2(b), transmission SGW holograms are also recorded with two beams: again one of them (the object beam) 212 hits the recording medium at a normal (or close to normal) angle $\Theta_1$ to the surface. However, in contrast to reflection SGW, in transmission SGW the second beam (the reference wave) 218 hits the recording medium 214 at shallow angle $\Theta_2$ from the same side of this surface.

These holograms are Bragg holograms with very high diffraction efficiency (theoretically 100%). General information about angular and wavelength selectivity of these Bragg holograms can be also found in Qiang.

An attractive feature of these holograms is in ability to couple light in the hologram to a substrate that is a few millimeters thick, and convey it along the substrate for significant distance, and then couple the light to an object outside of the substrate.

One step in designing a substrate-guided wave-based holographic see-through display is to define the geometry of the substrate-guided wave-based holographic see-through display. The worker of ordinary skill in the art will need to take into account the consequences of some choices that he or she may make.

One consideration is the geometry of the see-through display as a unit. For example, the display may be a generally flat panel intended to be placed in front of the viewers' eyes. In the alternative, the display may be a wrap-around visor with a curved, arcuate configuration.

Another consideration is how the image source and viewer's eye are positioned relative to each other. The image source (monocular) or sources (binocular) for example, may be placed above axis between the eyes of an intended viewer, or along the axis between the eyes. The sources may be placed to be alongside where the substrate is positioned before eyes, or it may be placed away from the face, aside the face, or even aside the head of an intended viewer.

The field of view is another important consideration, which depends in part whether monocular or binocular view is chosen, and other factors such as image source size, a hologram acceptance angle that depends on hologram recording geometry and thickness.

The size of the eye box is another consideration. The size of the eye box depends in part on the length of the path of the light from the image source to where the image is viewed and image source size, and in another part and the divergence of the image source and/or the collimation of the light after its emission by the image source. The desirable size of the eye box depends largely on the quality of viewing experience that is desired and the stability of the substrate-guided wave-based holographic see-through display.

Referring again to FIG. 1, another factor to consider is the size of the microdisplay 130. The size of the microdisplay will strongly influence the size of the holograms, the angle that the $H_1$ hologram 112 directs the light in, and the ability of the $H_2$ hologram 114 (for the viewer) to reassemble the image. Another consideration is whether the microdisplay 130 is monochromatic or has a plurality of colors, most operatively 3.

Referring back to FIG. 1, we see a side view of the general geometry of one embodiment of a substrate-guided wave-based holographic see-through display.

The specifics of the functioning of this particular geometry of a substrate-guided wave-based holographic see-through display 110, as well as other geometries, will be discussed later. However, before that, an explanation of how to build substrate-guided wave-based holographic see-through display is provided.

A flat visor display can comprise one or more flat transparent substrates 116, one or more pairs SGW holograms laminated to it ($H_1$ 112 & $H_2$ 114), and one or more microdisplays 130. The holograms 112, 114 are transparent to the ambient light because light does not hit them (with extremely minor exception) at the Bragg angle. The viewer's eye sees the microdisplay image when microdisplay is on, because light from microdisplay, after it is coupled inside the visor by hologram $H_1$ 112 and propagated along it due to internal reflection, hits the hologram H₂ 114 at its Bragg angle and couples out the light from the microdisplay 130 to the eye 132.

The high diffraction efficiency of each SGW Bragg holograms results in very high light throughput of the entire optical system. While the light throughput is theoretically 100%, experimentally more than 80% throughput can be achieved. Other see-through displays based on beam combiners, such as semitransparent or dichroic mirrors, have much lower light throughput.

There are two main conditions that a visor substrate should satisfy, if there are no other mechanical requirements, they are transparency and internal reflection. Further, the index of refraction and the indexes of refraction of $n_s$ of the substrate and hologram $n_h$ should match as close, as possible.

The transparency of the substrate provides the see-through FOV, and minimizes optical losses of the beam that propagates along the visor from microdisplay to the viewer's eye.

We tested three substrates: acrylic ($n_a$=1.49), glass ($n_g$=1.5), and polycarbonate ($n_p$=1.55). Average hologram index of refraction before exposure is $n_{0h}$=1.49, after exposure $n_h$=1.51.

Referring to FIG. 3, beam propagation from the air into a hologram, and from the hologram into a substrate and then from the substrate in the air, and vice versa obeys Snell's law (see formulas 1-1, 1-2, 1-3):

$$\sin \theta_a / \sin \theta_h = n_h \quad (2\text{-}1)$$

$$\sin \theta_h / \sin \theta_s = n_h/n_s \quad (2\text{-}2)$$

$$\sin \theta_s / \sin \theta_a = 1/n_s \quad (2\text{-}3)$$

If the hologram is to be protected with glass or other material (more operatively it is the same as the substrate material) then another layer of substrate material should be added on top. Adding particular thickness of protection layer on the top of hologram can affect the beam propagation for a particular configuration of transmission and reflection holograms depending on the thickness of this layer. If thickness of this layer is <1 mm, its influence is well within workable limits for most materials.

Figure 4:
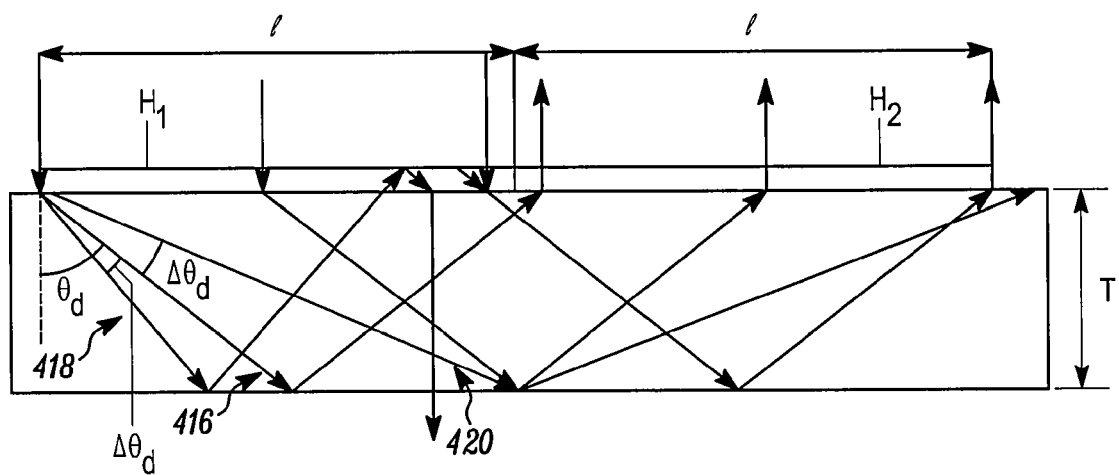
FIG. 4 illustrates the situation where the light that is coupled into the substrate diverges.

Attention needs to be paid to the beam refraction in layers because refractive angles, as well as diffractive angles, are important for substrate-guided wave-based holographic see-through display. FIG. 4 shows how these angles, as well as substrate thickness, are related to the hologram size. These angles also can affect FOV. The wider FOV, the larger acceptance angle holograms should have.

Depending on the required FOV, appropriate hologram $H_1$ focal length is chosen. The wider is the FOV, the shorter the focal length that is needed. At the same time shorter focal length makes the eye box move closer to the visor, or even inside the visor. This accordingly reduces FOV.

FOV also can be increased by increasing the hologram size. In both cases the hologram angular selectivity should be taken into account.

Image brightness and uniformity depend on whether the holograms can accept the same amount of light irradiated by each part of the microdisplay. This can be determined experimentally during the design process by those of ordinary skill.

Here the case is considered when the holograms and the viewer's eye are on the same side of the substrate-guided wave-based holographic see-through display as the microdisplay, and the hologram is not protected with additional layers of glass or other material. More complicated scenarios with additional, but non-holographic layers can be worked through by those of ordinary skill in the art. The holograms $H_1$ 112 & $H_2$ 114 in the following example are transmission SGW holograms.

In FIG. 4 the path started by arrow 416 (illustrated with $\Theta_d$ from the dashed line, as opposed to line 418 indicated by the difference $\Delta\Theta_d$) illustrates how light that hits hologram $H_1$ 412 from air is diffracted at angle $\Delta\Theta_d$, reflects from the bottom at TIR, hits the hologram $H_2$ 414 and couples back in air.

If the angle of the diffracted beam differs significantly from $\theta_d$ by angle $\Delta\Theta_d$ (either it is significantly larger than $\Theta_d$ or smaller), then these beams 418, 420, after they experience internal reflection from the bottom, either diffract on the same hologram and couple out down, or they pass by hologram $H_2$ and don't go in right direction, hence they don't participate in image formation. It means that hologram size/422, diffractive angle $\Theta_d$, minimal distance between holograms, and substrate thickness T (see FIG. 2.3) are dependent on formula (2-4).

$$1/2T = tg\Theta_d \quad (2\text{-}4)$$

For example, if the hologram size is 25 mm (approx. 1 inch), and substrate thickness is 6 mm, then angle $\Theta_d$ is equal 64°. If it is desired to reduce the visor thickness (to reduce the weight, or if we want to move further two holograms one from another to position microdisplay much further from the viewer's eye), we need to increase angle $\Theta_d$ Table 1 shows how diffracted angle $\Theta_d$ varies with substrate thickness (T) 424, change.

TABLE 1

Variation of diffracted angle $\Theta_d$ of SGW hologram with substrate thickness change

| Hologram size | Substrate thickness, mm | | | | | |
|---|---|---|---|---|---|---|
| | 1 | 2 | 3 | 4 | 5 | 6 |
| 25 mm | | | | | | |
| TIR angle, degree | 85.4 | 81 | 76.5 | 72.3 | 68.2 | 64 |

Substrate thickness (T) 424 reduction leads to the necessity of increasing diffraction angle, which in turn increases the requirement to achieve index matching of the hologram and the substrate. Substrate thickness reduction also increases requirements to achieve index matching of optical elements during recording (will be shown later). If on the border between two layers there is significant jump of index of refraction, light experiences significant Fresnel reflection, or it just may not penetrate from one layer in another due to TIR effect.

There are several possible geometries of holograms positioned on the visor. They can be used to build the substrate-guided wave-based holographic see-through display that fits the best way to end-user needs. Reflection and transmission holograms work differently at play back even if the geometry of the substrate-guided wave-based holographic see-through display looks the same.

In FIGS. 5, 6, 7 and 8 show variations of how transmission SGW holograms work for various geometries. Each of these playback setups is a possible alternative for use in the receipt and transmission of light through permutations of reflection and transmission holograms positioned on the same or different sides of the substrate. Those of ordinary skill in the art will appreciate a combination that can be applied to a given application, and these alternatives should be taken to apply to the examples set forth in this application.

Figure 5:
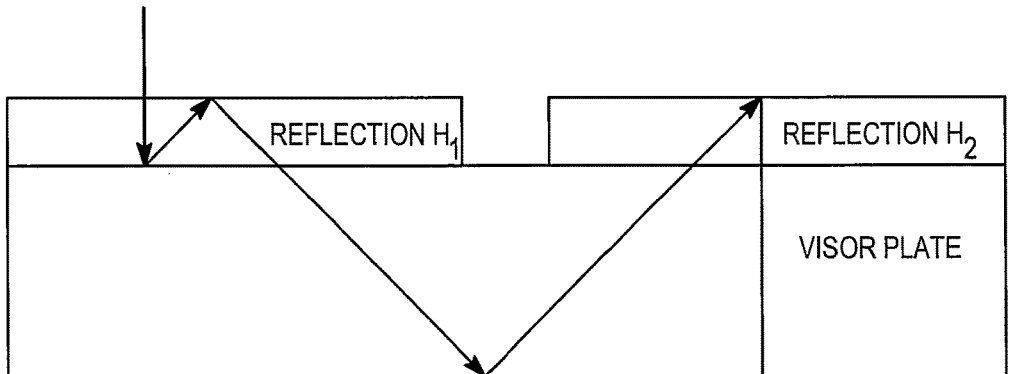
FIG. 5 shows one configuration for how substrate-guided wave-based holograms work at playing back input.
Figure 6:
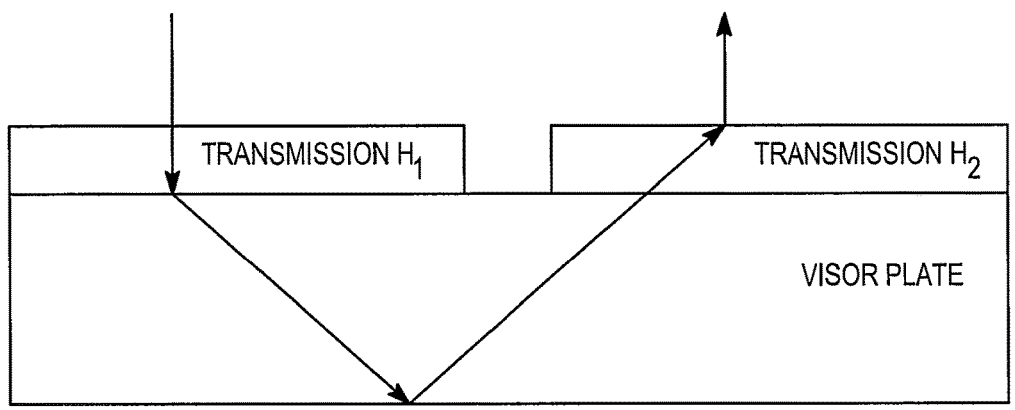
FIG. 6 shows a second configuration for how substrate-guided wave-based holograms work at playing back input.
Figure 7:
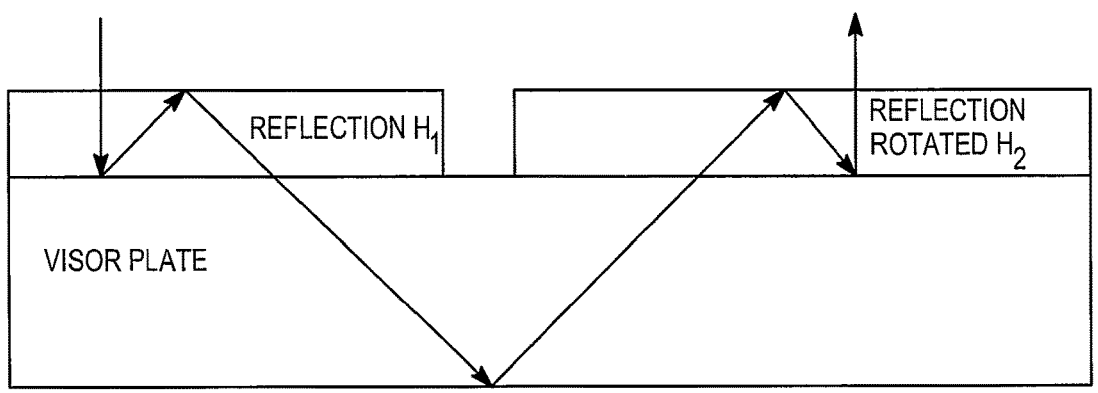
FIG. 7 shows a third configuration for how substrate-guided wave-based holograms work at playing back input.
Figure 8:
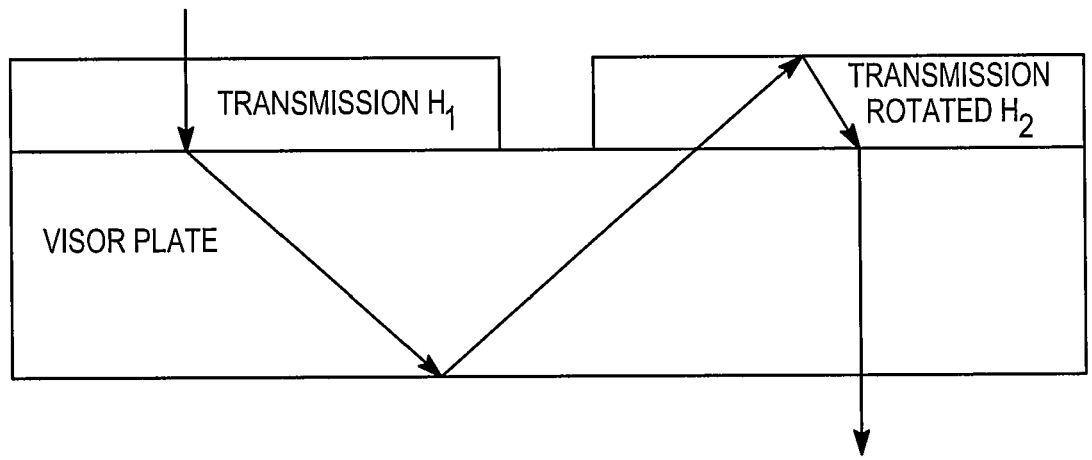
FIG. 8 shows a fourth configuration for how substrate-guided wave-based holograms work at playing back input.

The playback setups shown in FIGS. 5 and 8 act the same (retrieving beam hits holograms from top and is coupled out from the bottom, even though setup in FIG. 5 is built using reflection holograms, setup in FIG. 8 is built using transmission holograms). Also setups shown in FIG. 6 and FIG. 7 act the same (retrieving beam hits holograms from top and is coupled out from the top, even setup in FIG. 6 is built using transmission holograms, setup in FIG. 7 is built using reflection holograms). The difference is in rotating SGW holograms in FIGS. 7 and 8 by 180°.

That means that developing a display using SGW holograms can be very flexible in that the microdisplay and the viewer's eye can be positioned on the same side of the visor, or on different sides of the visor. There are other geometries that include mixed transmission and reflection holograms, or holograms positioned on different side of the visor (both transmission, reflection, or mixed). By positioning these mixed holograms either at Bragg angle to the direct beam, or at Bragg angle to the beam experienced TIR from the surface we can build display with optimized angle and wavelength bandwidth parameters, because Bragg selectivity of reflection and transmission SGW holograms differs. See Qiang reference.

Figure 9:
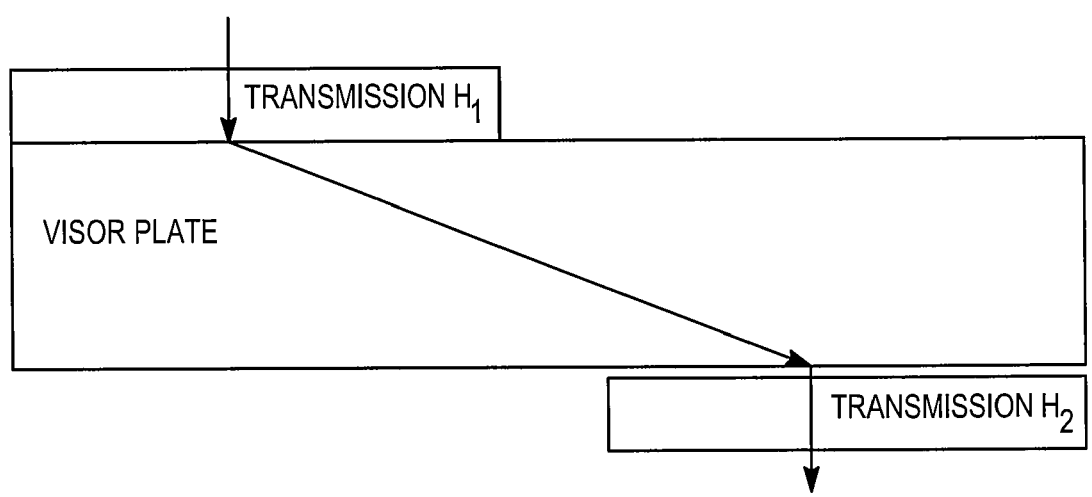
FIG. 9 shows a fifth configuration for how substrate-guided wave-based holograms work at playing back input.

As another example we include here in FIG. 9 that displays with SGW holograms laminated to the different sides of the visor. This alternative also can be applied to all of the examples set forth in this application with the application of ordinary skill to the teachings set forth in this disclosure.

In FIG. 9, the beam coupled in the substrate by transmission hologram $H_1$ crosses only one time the substrate and is coupled out by the hologram $H_2$ that is positioned at Bragg angle to the beam. This geometry shortens the beam path inside the substrate for the expense of increasing diffraction angle. Same beam path length would be, if substrate thickness would be reduced by half, and if the diffractive angle would be as shown in FIG. 9. Hologram $H_2$ can be SGW reflection and beam still can be coupled out down, if hologram is rotated 180°.

The beam in the substrate (here labeled visor plate, which is synonymous for this purpose) can experience multiple internal reflections, if there is necessary length to separate the holograms. Here it is necessary to note that the hologram beam path separation is related to the eye box position.

To couple the microdisplay image to the visor plate at the larger than or equal to the total internal reflection angle (most operatively larger than total internal reflection angle), holograms $H_1$ and $H_2$ should be recorded using optical setups in which one of the recording beams hits the holographic material at normal (or almost normal) angle, another beam should be coupled in the substrate and hit the holographic material at internal reflection angle. This internal reflection angle will be relative to an understood medium of operation, eye box position, substrate thickness, hologram size. That is why these holograms are called SGW holograms. To satisfy TIR angle condition two main recording geometries can be used.

One of the recording geometries uses a prism as shown in FIG. 10. To couple the light from the prism in the holographic material immersion liquid is used with the index of refraction that matches index of refraction of holographic material.

Figure 10B:
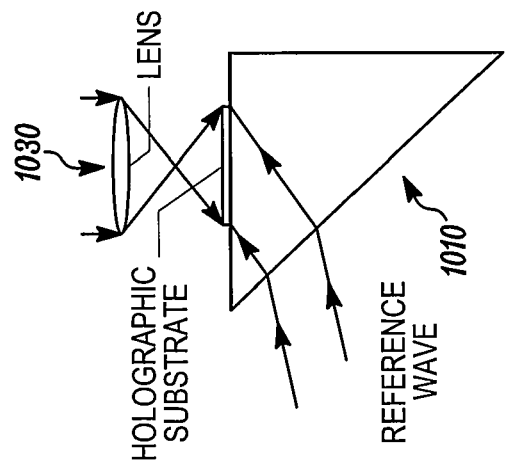
FIG. 10 is a first diagram showing a recording setup for substrate-guided wave-based holograms.
Figure 10A:
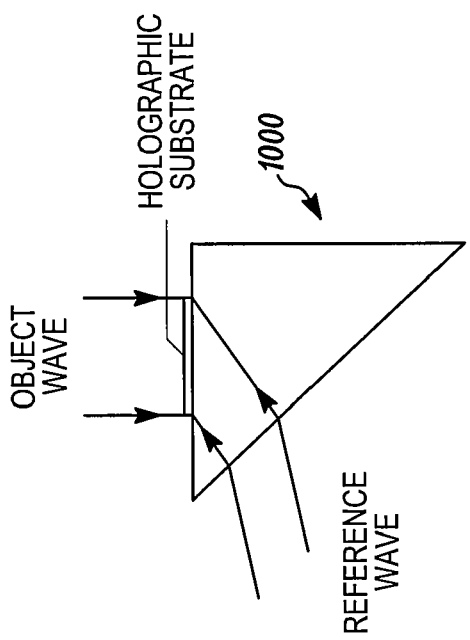

FIG. 10(a) shows how reflection SGW hologram $H_2$ (without optical power) is recorded. FIG. 10(b) shows how reflection SGW hologram $H_1$ (with optical power—holographic lens) is recorded. The recording uses an outside medium 1000 or 1010, a reference beam 1020, an object wave 1030 and a holographic recording medium 1030. The lens 1040 is used to invert the image to obtain correct viewing.

To record transmission SGW hologram other recording geometry is used shown in FIG. 11.

Figure 11B:
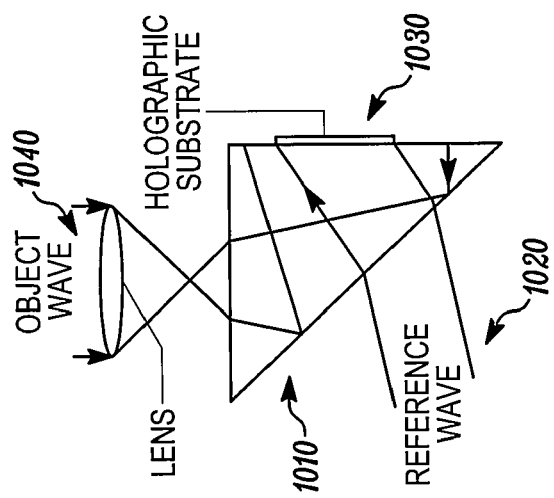
FIG. 11 is a second diagram showing a recording setup for substrate-guided wave-based holograms.
Figure 11A:
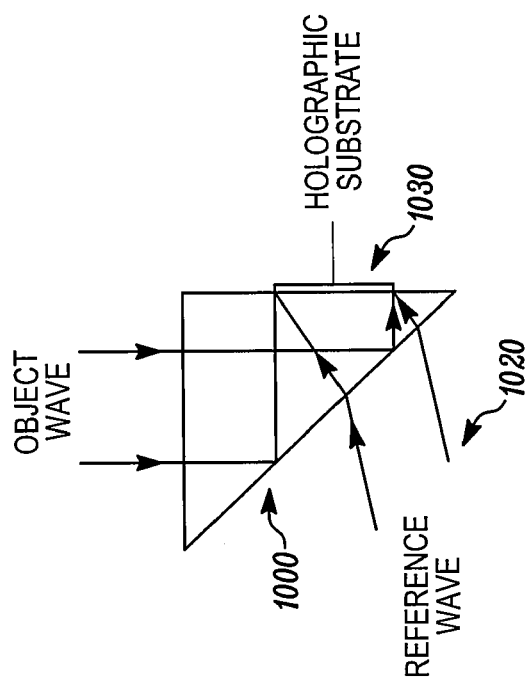
Figure 12:
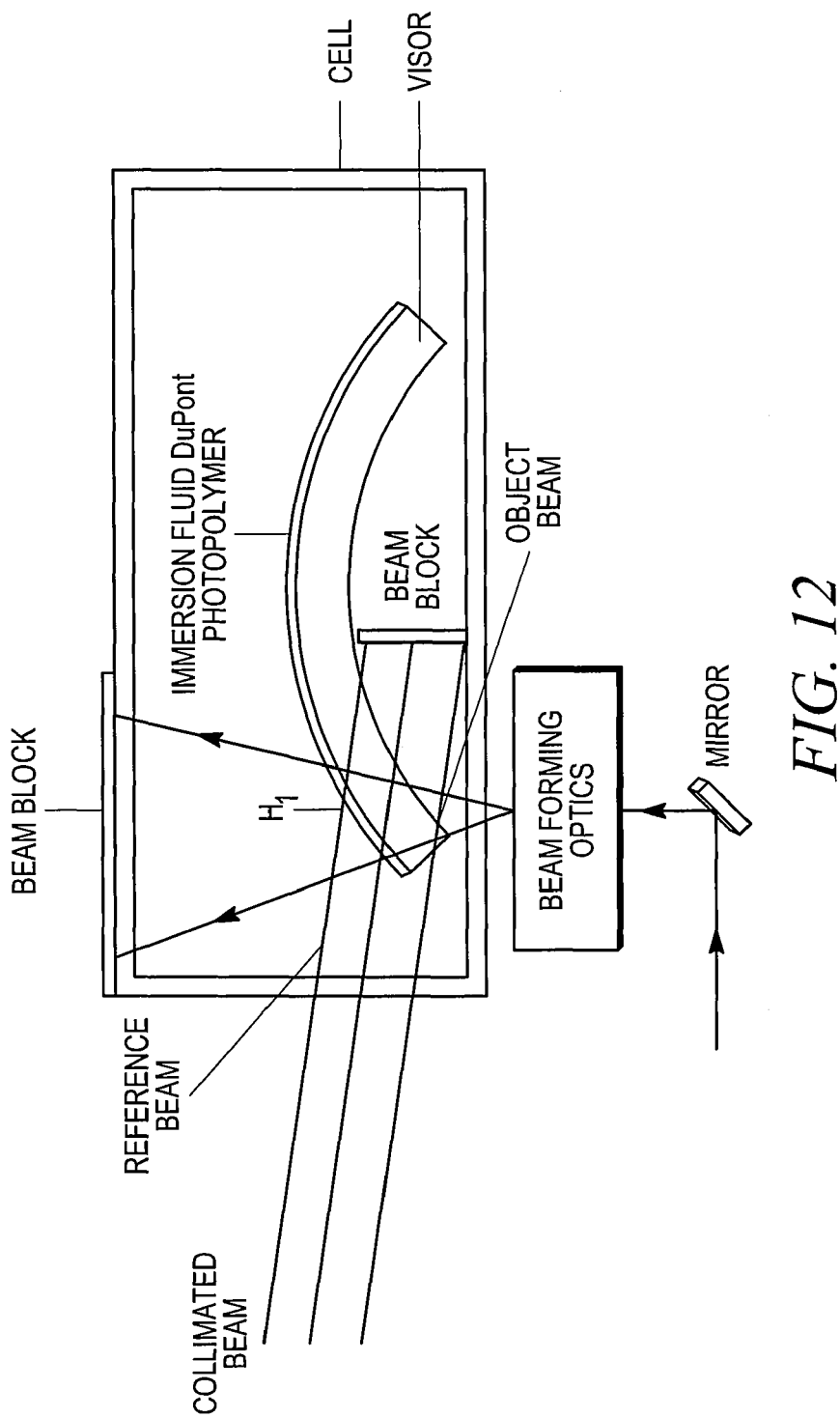
FIG. 12 is diagram showing a recording setup for substrate-guided wave-based holograms for arcuate substrates.

FIG. 11(a) shows how transmission hologram $H_2$ (without optical power) is recorded. In FIG. 11(b) it is shown how transmission hologram $H_1$ (with optical power—holographic lens) is recorded. The parts are the same as in FIG. 10, but FIG. 10 has one beam coming from the outside medium and one from the environment, while FIG. 11 has both beams coming from the outside medium.

Figure 13:
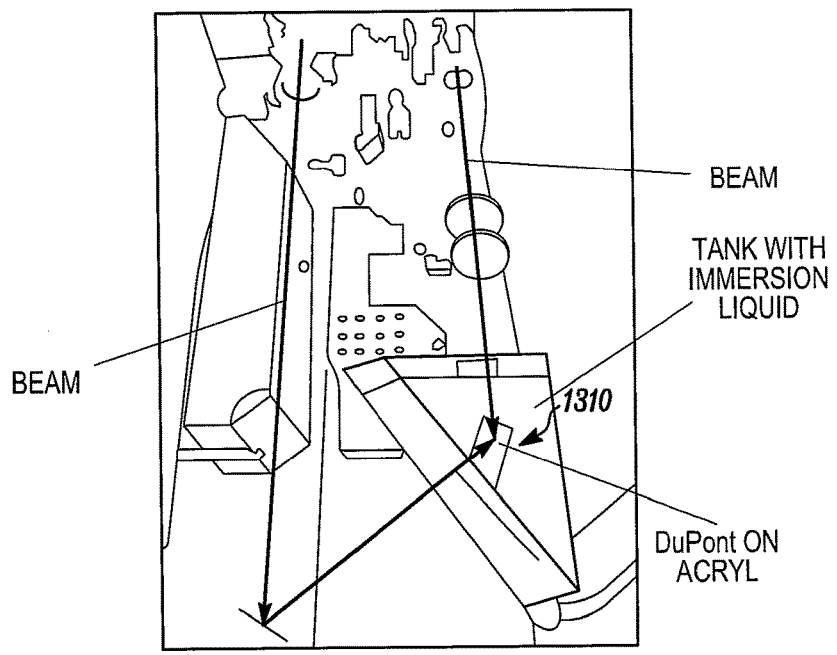
FIG. 13 is a diagram showing a recording setup for substrate-guided wave-based holograms using an immersion tank.

Another method of recording SGW holograms includes immersion them in a tank 1310 with immersion liquid as shown in FIG. 13. This method is specifically useful if visor is curved, as shown in FIG. 13.

Depending on if display is monochrome or has a plurality of colors (exemplarily 3), appropriately sensitized holographic recording material is chosen. In any case it should be a high transmission phase material. We used holographic 7-micron and 120-micron thick recording polymer provided by DuPont. Other recording materials are also available.

Figure 14:
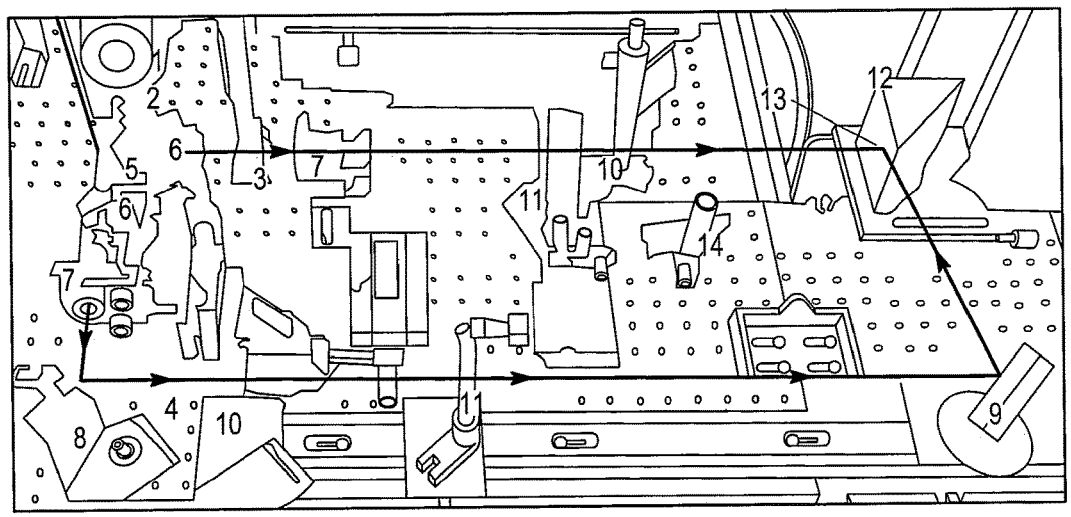
FIG. 14 is a diagram showing a detailed laser table setup for recording substrate-guided wave-based holograms.
Figure 15:
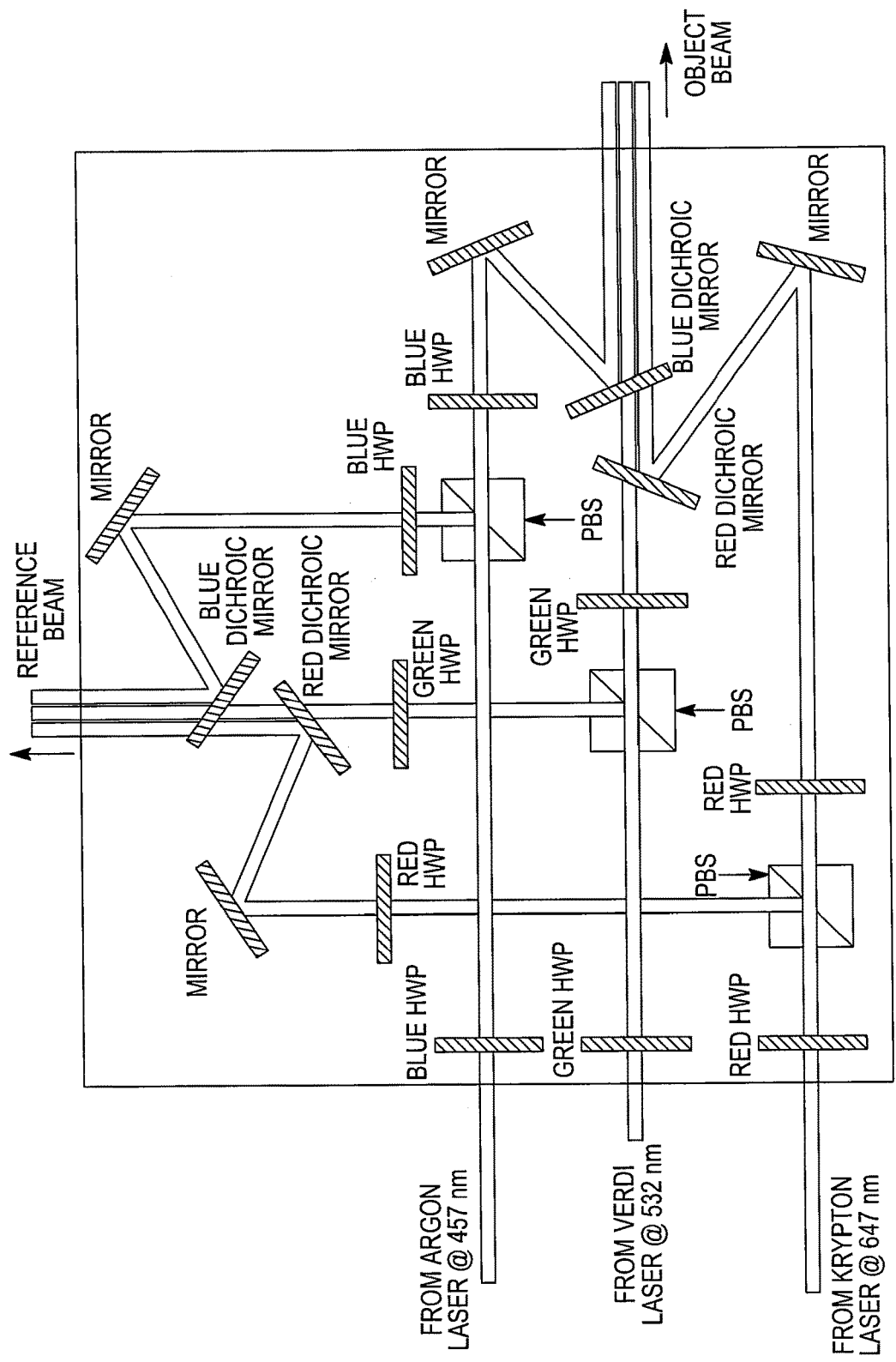
FIG. 15 is another diagram of a laser setup for recording substrate-guided wave-based holograms.

If hologram is monochrome, the hologram can be exposed using Verdi DPSS 532 nm laser manufactured by Coherent. The holographic table should be appropriately vibration-isolated to stabilize the optical system and minimize wavefront shift during hologram exposure. One of the setups used for reflection SGW holograms recording is shown in FIG. 14.

The optical set-up to record reflection SGW holograms: 01—mechanical shutter; 02, 06—half-wave plates; 03, 04—laser beams; 05—polarizing beam-splitter; 07—spatial light filters; 08, 09—mirrors; 10—collimating lenses; 11—diaphragms; 12—prism; 13—sample; 14—lens holder.

The DuPont material was laminated to the 1 mm thick glass substrates. These substrates were index matched to the prism 12 shown in FIG. 14. Holograms were exposed at ~30 mJ/cm², UV cured for 5 minutes to bleach the dye, and then baked at moderate temperature (less than 100° C.) to increase the diffraction efficiency. Achieved diffraction efficiency of each SGW hologram was up to 90%. Transmission was more than 90%. Total diffraction efficiency of display measured for two holograms was up to 60%.

Also recorded were 3-color holograms using 3-color laser system contained Argon (457 nm), DPSS (532 nm), and Krypton (647 nm) lasers and the developed and a color mixing box (not shown).

3-color holograms were multiplexed in the same layer of polymer and diffraction efficiencies were balanced to create white color when retrieved with the 3-color microdisplay. Our substrate-guided wave-based holographic see-through display requires wide bandwidth microdisplay image source to provide wide FOV. A narrow laser line spectrum image creates narrow FOV.

Figure 16:
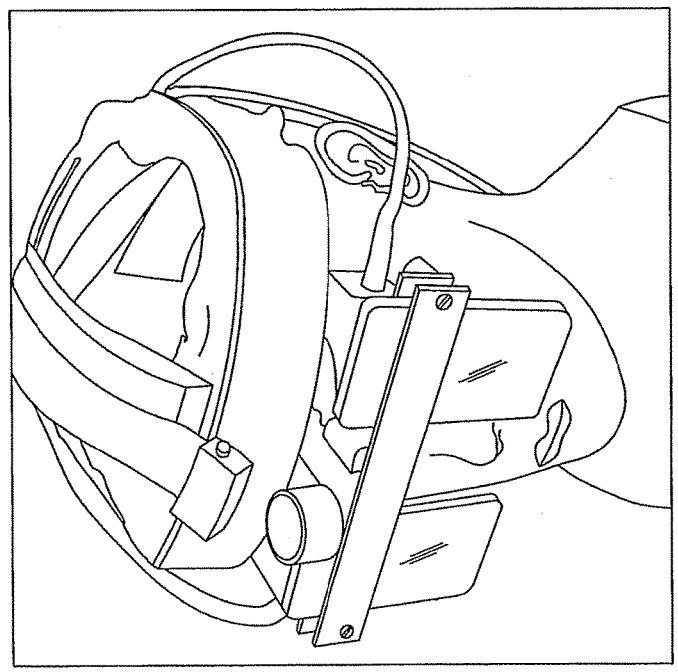
FIG. 16 is an image of a head-mounted holographic substrate-guided wave-based see-through display.

In FIG. 16 shows an example of a head mounted version of substrate-guided wave-based holographic see-through display. FIG. 16 is a so-called vertical hologram geometry in what limited hologram angular selectivity complies better with common aspect ratio of microdisplays 4 (horizontal): 3 (vertical).

In case we are to display the image to be viewed like it would becoming from infinity (as in FIG. 1), microdisplay is positioned in the focal plane of hologram $H_1$. This forms eye box in the focal distance from the holographic lens. This imposes limitations on the holographic lens $H_1$: the shorter focal length is, the wider FOV; at the same time eye box moves closer to the substrate. To keep eye box at appropriate distance from the visor providing sufficient eye relief (~30 mm), additional optics can be needed, or hologram $H_2$ may be recorded as HOE with optical power.

Figure 17:
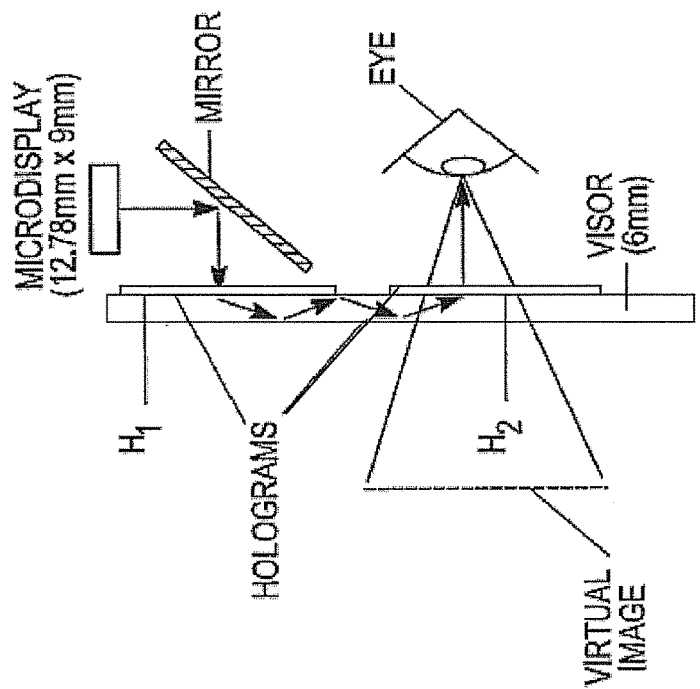
FIG. 17 is an image showing a geometry for a holographic substrate-guided wave-based see-through display.
Figure 18:
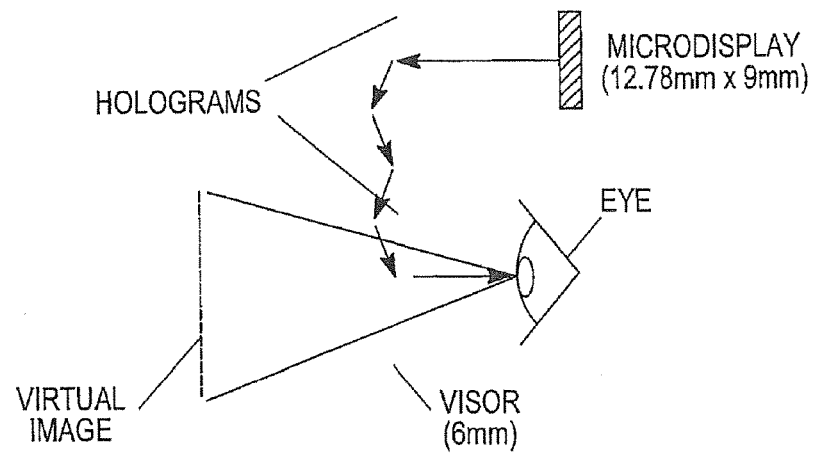
FIG. 18 is a second image showing a geometry for a holographic substrate-guided wave-based see-through display.
Figure 19:
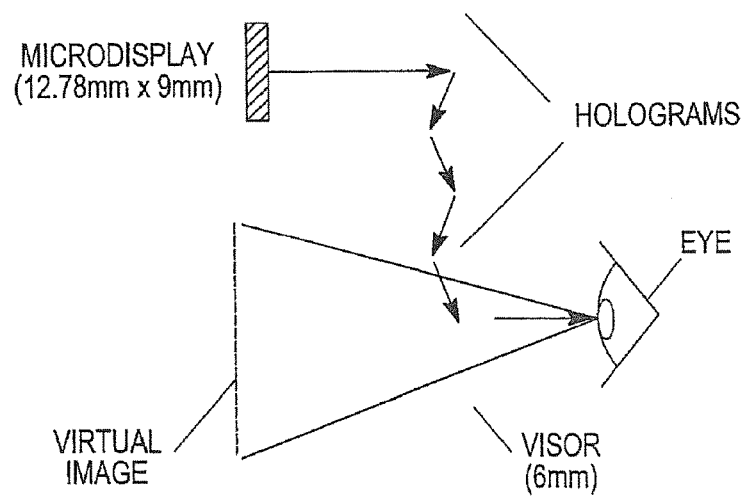
FIG. 19 is a third image showing a geometry for a holographic substrate-guided wave-based see-through display.

FIGS. 17, 18 and 19 show some substrate-guided wave-based holographic see-through display geometries. FIG. 17 shows the general optical layout of the developed at Luminit. In FIG. 2-17 is a configuration (folded vertical geometry with a mirror). In the configurations shown in FIGS. 2-18 and 2-19, the microdisplay is parallel to the visor; the long side is horizontal, while the short side is vertical.

Figure 20A:
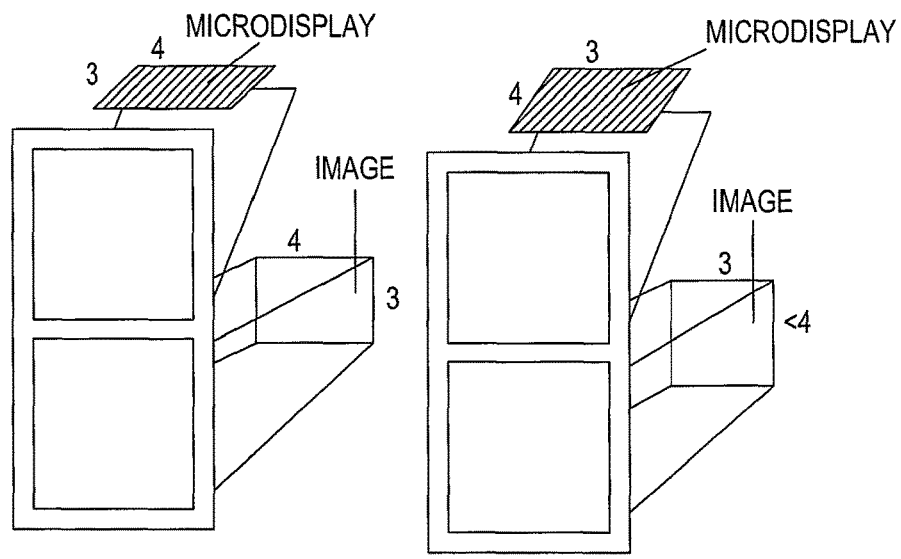
FIG. 20 is a diagram showing how the arrangement of elements can affect the rotation and orientation of displays so that they can be controlled.

FIG. 20 illustrates issues that can arise from microdisplay positioning relative to the holograms. In FIG. 20a, on the left, the microdisplay is positioned with the long side horizontal alongside the visor. The short side should be perpendicular to the visor. In this case, the entire microdisplay image with the aspect ratio 4 (horizontal) to 3 (vertical) will be visible.

FIG. 20a on the right shows what happens if the microdisplay is rotated 90° on the Z-axis that is perpendicular to the microdisplay image plane as in FIG. 20a on the left. The result is that the viewed image will be rotated 90°, but the entire long side of the microdisplay image may not be visible.

Figure 20B:
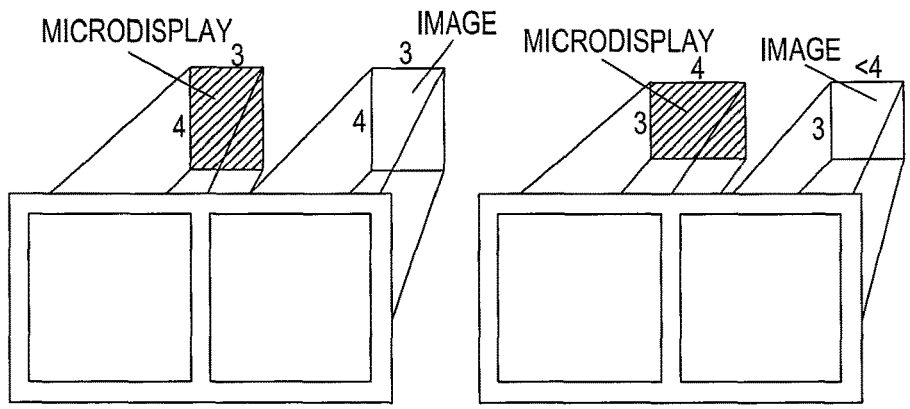

If microdisplay is positioned to the side (FIG. 20b), the visor should be rotated 90° (horizontal two hologram geometry). Accounting for the microdisplay aspect ratio of 4 (horizontal) to 3 (vertical), there is possibility that the entire image along long side may not be imaged (FIG. 20b right).

To view the entire image, the microdisplay should be rotated 90°, which is not compatible with the accepted standard image aspect ratio 4:3. The same result happens if in vertical geometry we rotate the microdisplay 90°, image also will be rotated, but the entire long side may be not imaged (FIG. 2-20a right).

FIG. 2-20 clarifies how the microdisplay size, its orientation and position, orientation of the holographic visor, and resulted image orientation and size are related in the current design. The current design (shown at the left of FIG. 2-20(a)) correctly images the microdisplay.

Other geometries are also possible with holograms laminated to the front, or to the opposite sides of the visor, as shown in FIGS. 5 through 9.

The microdisplay alone provides the image that can be seen directly from different directions due to the diffused light. The cone α of diffused light forms the eye box (or viewbox, see FIG. 1). Another advantage of diffuser, that it distributes the light from each pixel to the large area of hologram. This creates redundancy and decreases the probability that particular part of the image can disappear if hologram is damaged.

The embodiments disclosed earlier discuss a wide bandwidth microdisplay image source to provide wide field of view (FOV). A narrow laser line spectrum image creates a narrow FOV. The limited FOV for the laser based image source is determined by the thick hologram Bragg angle- and the wavelength selectivity of that hologram.

Multiple bounces can be used in the substrate and parameters of hologram $H_2$ that couples the image out to the viewer can be adjusted in order to improve FOV for narrow waveband (or laser based) image source.

The two optical setups below clarify this idea.

Figure 21:
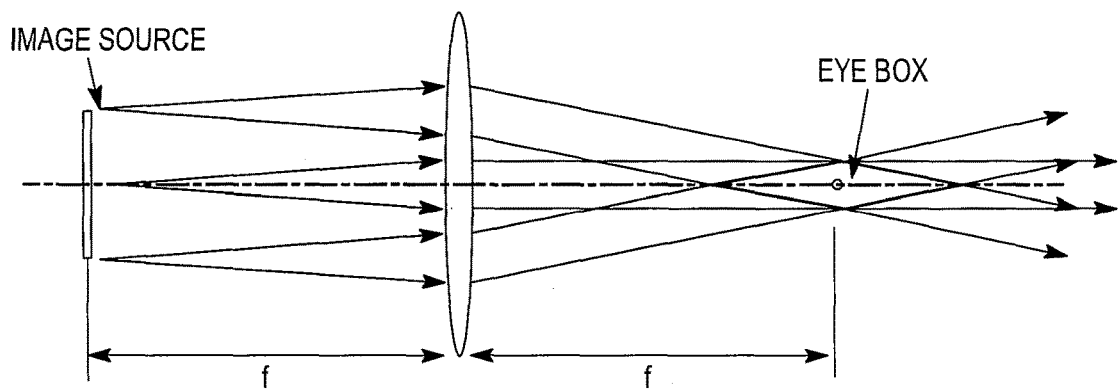
FIG. 21 is an illustration of a classic definition of an eyebox.

First setup shown in FIG. 21 shows how eye box is created in traditional collimated display, based on ordinary bulk lens system.

Eye box size depends on the cone of angles created by the diffused light emanating from image source. In any case for collimated displays it is maximal in the rear focal plane of the lens. There is only one eye box, because after the beams, emanated by different field points of the object, create the eye box, they diverge and do not intersect anymore.

In the case of a substrate guided wave based collimated display the situation is different. Many eye boxes can be created, because light emanated by the image source and coupled inside the substrate by appropriately designed holographic lens $H_1$, experiences total internal reflection (TIR) and bounces until it is coupled out by the second hologram $H_2$ (see FIG. 22).

Beams A (dashed) and C (dot-dash), emanated from the extreme field points of the image source, after at least two internal reflections, hit the surface of the substrate adjacent hologram $H_2$ at a required distance one from another much larger than the distance between them after first total reflection from the surface distant from the holograms (see bold braces in FIG. 4). Distance between A and C can be calculated in advance using beam propagation simulation software ZEMAX that takes into account all the parameters involved: initial distance between beams A and C as they enter the substrate after diffracting from hologram $H_1$: diffraction angle; substrate thickness and index of refraction; number of bounces; wavelength; hologram $H_1$ focal length, etc. The angular divergence of rays A and C are defined by hologram $H_1$'s focal length and also can be determined in advance. These parameters (distance between A and C and angular divergence of A and C) are needed to calculate the parameters for the hologram $H_2$.

Figure 23:
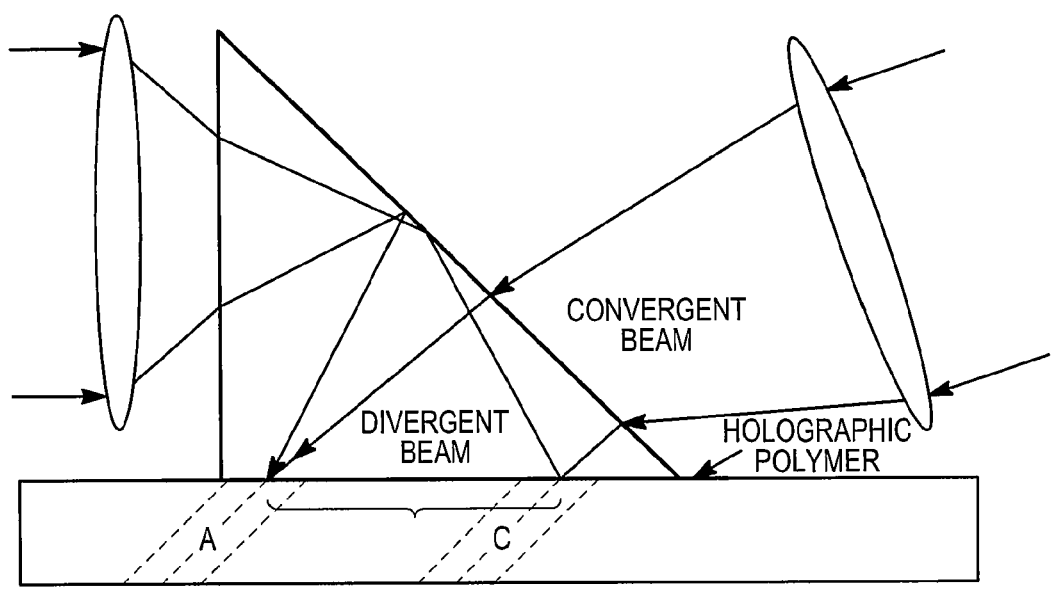
FIG. 23 is another setup to record a hologram for use in the present invention.

The setup to record hologram $H_2$ is shown in FIG. 23. Hologram $H_2$ is recorded with two beams and a prism as shown in FIG. 5. Holographic polymer (~20 micron thick) is laminated to the substrate. A 45°-prism is index matched with immersion liquid to the holographic polymer. Two beams: one divergent another convergent, created using set of two lenses, are directed to the holographic polymer and record hologram $H_2$ on it. Convergence of convergent beam corresponds to the convergence of beams A and C. The divergency of divergent beam is equal to the FOV needed. In the prism it is reduced proportional to the prism index of refraction.

Figure 22:
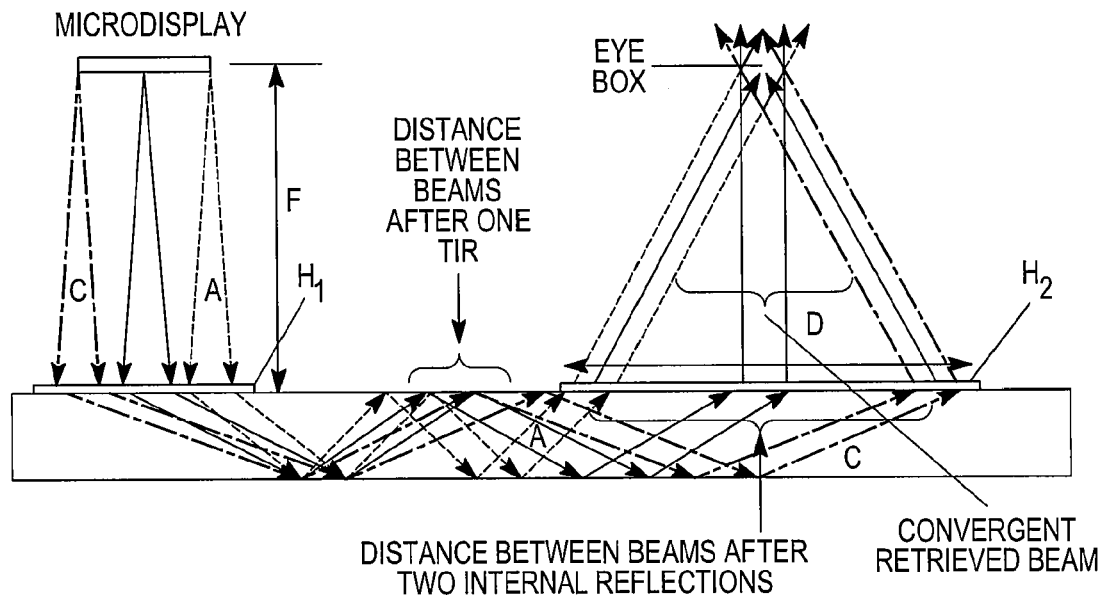
FIG. 22 is an illustration of the construction of an eyebox according to the present invention.

When the hologram $H_2$ is illuminated with guided beams A and C as shown in FIG. 23, these beams are coupled out in air and form eye box as shown in FIG. 22. To avoid focusing of these beams in such a way as results in a too small eye box, each of these beams A and C should be slightly divergent. This can be achieved by shifting the image source out of focus slightly closer to the hologram $H_1$. This shift can be determined experimentally, and is in the range of a few millimeters.

Figure 24:
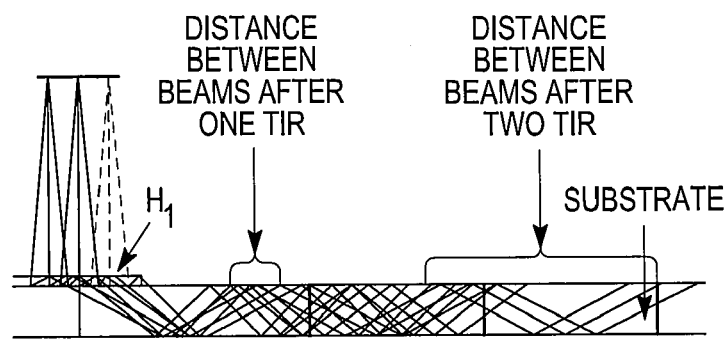
FIG. 24 is an illustration of a ZEMAX simulation of multiple bounces within a substrate.

FIG. 24 shows the results of a ZEMAX simulation for the beam propagation shown in FIG. 22. In this simulation the image source size is 5 mm, the substrate thickness is also 5 mm, hologram size is ~10 mm, reflection hologram focal length is ~20 mm, TIR angle ~60°. 3 beams (red, green and blue) are beams irradiated from 3 different field points of image source. The distance and beam directions are precisely determined by optical beam propagation simulation.

As we see, ZEMAX simulation proves that the distance between beams after two internal reflections is significantly larger than after single TIR, as it was in previously designed substrate-guided wave-based holographic see-through display, intended for working with wideband image source, and included above in FIGS. 1 to 15. If the same holographic grating as before is applied to couple these beams out of this embodiment out, they will diverge, and will not form an eye box. To form the eye box, the substrate-guided wave (SGW) based transmission hologram $H_2$ recorded using one divergent and one convergent beam as shown in FIG. 23 is used.

Because a thick hologram can be recorded with diffraction efficiency close to 100%, the guided beams, after they hit the holographic lens $H_2$, as per FIG. 23, are fully coupled out. The residue of the beam not diffracted out will not unduly degrade the image because of its diffuse nature. And even if the diffuse light hits the hologram $H_2$ again, it does not hit in satisfaction of the Bragg condition (SGW holograms are very angle selective, their selectivity measured experimentally is ~2 degrees), so it will propagate further along the substrate, and will be damped. It should be noted that some beam will hit the hologram first and not within the acceptance width of the Bragg condition, so they will propagate further and can be coupled out only after they hit hologram $H_2$ second time.

When extremely collimated, such as laser light, beams A and C hit the hologram $H_2$ as phase conjugated beams in satisfaction of the Bragg condition (taking the acceptance width into account), they will diffract in air and form an eye box at the distance equal to the point source during recording. To maximize the eye box, distance F (see FIG. 22) should be maximal. If F=100 mm, the eye box is ~10 mm—so that eye box is suitable for a good quality head-mounted display.

The output FOV here is almost independent of input FOV, and can be made more than 30°—this is the FOV desired for most of commercial head mounted displays. One condition here is that the diameter of hologram $H_2$ should be sufficient to create appropriate eye relief. Precise ZEMAX simulation can clarify all these conditions. This hologram can be recorded with different focal lengths, so eye relief is adjustable same as FOV.

Obviously, as seen from the presented ZEMAX simulation result, the retrieved image can be aberrated (because beams irradiated by extreme field points originally were at the same distance from the center; when they hit hologram $H_2$ the distance was different). To minimize these aberrations, different techniques can be implemented, such as recording predistorted holograms, using aspherical optics on top of image source during retrieval, and predistortion of the image on the image source display.

Proposed FOV improvement using multiple internal reflections can be implemented also to improve eye relief and the size of the eye box. This technique works for monochrome and 3-color laser based laser (or LED) image sources.

As those of ordinary skill in the art will appreciate, it is possible that with many internal reflections over a distance, it is possible for the light sources to overlap at a particular reflection. In order to facilitate proper coupling (in any embodiment) at the exit hologram, the light beams should exit in a distinct order. For example, in the 3-beam display, the beams should exit in the order 1-2-3 or 3-2-1 with respect to the direction of travel. Particularly complicated, but possible embodiments can be achieved by properly transforming the image at the source to achieve the proper order of beams at exit.

Another embodiment of the invention uses two or more monochrome or color display sources such as LCDs, OLEDs, per eye. This approach uses a corresponding number of in-coupling substrate-guided holograms. As was the case of a single-hologram per eye, the in-coupling hologram can be placed onto a transparent visor, flat or curved, in such a way as the images created by each display source are coupled by the two or more corresponding input substrate-guided holograms into the transparent visor. The images are transferred by means of total internal reflection towards an output hologram, which is placed on the same visor in such a way as to output both images towards the viewer's eye creating a seamless image consisting of multiple separate images generated by the display sources. The seamless property provides an increased field-of-view for the viewer.

Figure 25:
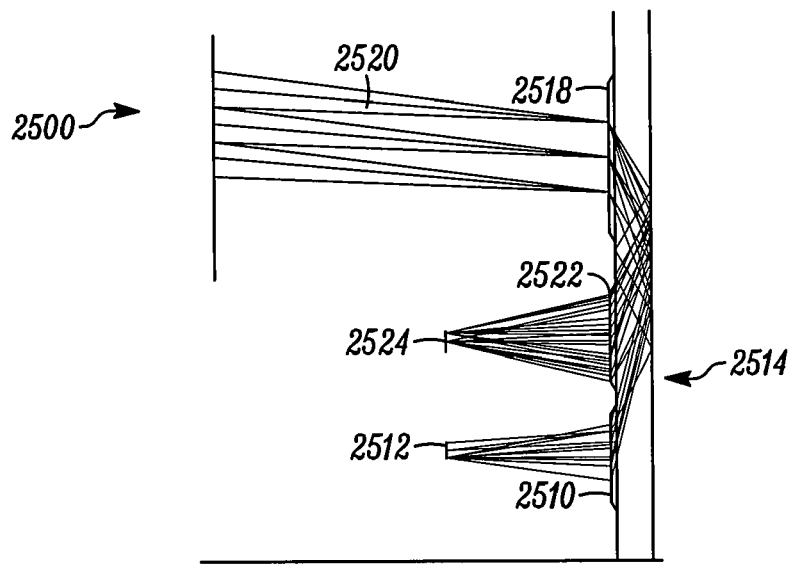
FIG. 25 is an illustration of how two microdisplays can be used to display one final image.

As an example, for the purpose of providing an increased field-of-view for the viewer, image tiling is brought about through seamless integration of two virtual images generated by two separate image sources such as LCDs or OLEDs in a way described as by an optical arrangement 2500, FIG. 25. A substrate-guided input hologram H1 (hologram lens) 2510 inputs the image generated by a display source DS1 2512 into a transparent visor substrate 2514 where the above-mentioned image is transferred through internal reflections towards the output hologram H3 (hologram grating) 2518, which, in turn, outputs the image towards the viewer's eye. A substrate-guided hologram H2 (hologram lens) 2522 inputs the image generated by a display source DS2 2524 into the visor substrate 2514 where the image is transferred the same way to the output hologram H3 2518, which outputs this image towards the viewer's eyebox 2520 the same way it does for the image from DS1 2512. H1 2510, H2 2524, and H3 2518 are positioned in such a way as images generated by DS1 2512 and DS2 2524 are transferred by H1 2510, H2 2922, the visor substrate 2514, and output by H3 2518 so that the viewer sees a seamless image composed of two halves generated by DS1 2512 and DS2 2524. Thus, an increase in the field-of-view perceived by a viewer is achieved.

Another aspect of the present invention relates to a two-coupled hologram system designed for forming and transferring an image in infrared light of the eye to a near infrared camera. The system can comprise one or more near infrared light emitting diodes illuminating the viewer's eye at one or more illumination angles, a light input hologram (hologram lens) (as usually denoted as H1 throughout the application positioned at a transparent visor substrate, flat or curved, opposite from the viewer's eye at its focal distance away from the eye. The input hologram H1 captures the near infrared light reflected from the eye, and transfers the near infrared image into the substrate. The substrate transports the image through internal reflections inside the transparent visor to the second, output hologram (hologram grating), as usual denoted as H2, placed on the substrate at some pre-determined location and coupled to the first one through above-mentioned internal reflections. The output hologram transfers the image of the eye to an outside camera, which is placed to receive the image from the output hologram. The camera captures the image in real time, or at pre-determined time intervals. The above-mentioned camera can be connected to a processing hardware unit that can, according to technology well known in the art, provide processing of the obtained video information with the purpose of extracting the eye-gaze direction of the eye and its fixation point according to algorithms known in the art. The computer is capable of analyzing for pupil/saccadic movements of the eye. As with prior systems discussed, the system can be configured to be a non-obtrusive see-through system, i.e., it does not prevent the eye from seeing a full-angle scene as the eye would see without it.

A two-hologram system described above, with an additional functionality of forming/transferring image in the near infrared light (NIR) with addition of illuminating infrared light-emitting diode(s) and a miniature camera for the purpose of capturing/obtaining eye gaze direction/fixation point and other related parameters.

The infrared eye monitoring device can be a non-obtrusive see-through device, and can capture parameters regarding the location and attitude of a viewer's eye throughout the viewer's full visual field. The 'eye capture' system can be mounted on a helmet, headgear, or spectacles, or other mounting and can send a data stream to a remote hardware unit/computer. The device can monitor the viewer, as impairments in the viewer's pupil and eye movement can signal fatigue and sleepiness, medication use, toxin exposure, or impending performance failure. At the same time, the viewer can also use it, for example, to turn an instrument on or off if the computer is properly integrated into its environment, such as a driver's seat, airplane cockpit, or other control environment.

The purpose of the system is to capture eye movements, eyelid movements, and pupil size changes for physiological monitoring. A second purpose is to locate points of fixation/gaze direction.

Referring to FIG. 26, the system consists of: a near infrared LED(s) positioned in such a way as to provide illumination of the viewer's eye, a transparent flat (or curved) visor substrate with (i) input hologram $H_1$ (hologram lens) placed on the visor in such a way as to be capable of capturing near infrared light reflected from the viewer's eye, (ii) output hologram $H_2$ (hologram grating) placed on the visor in such a way as to be capable of transferring the near infrared eye image towards an outside miniature camera (such as a CCD/CMOS camera), connected to an external hardware/software processing unit (not shown), whose function is to extract the eye gaze direction/fixation point, information on saccadic movements according to algorithms known in the art.

Holograms for the infrared eye-tracking system can be either of a transmission or of a reflection type. The description of the reflection type recording (hologram grating) is described as follows.

If the hologram was recorded with a wavelength $\lambda R$ different from a retrieving wavelength $\lambda_{NIR}$, then the relationship between recording/retrieving wavelengths and angles is given by the equation:

$$\lambda_{NIR}/\lambda_R = \sin(\theta_{NIR}/2)/\sin(\theta_R/2), \tag{2-1}$$

As an example, substituting $\lambda_{NIR}=940$ nm, $\lambda_R=647$ nm, and $\theta_{NIR}/2=66°$, we get $\theta_R/2=39°$. To have this recording angle while keeping the hologram Bragg planes at the same angle, we need to guide the 647 nm beam at an angle of 15° to the surface. Coupling of near infrared light into the waveguide is shown on FIG. 27(*a*). The direction of the 647 nm recording beams is shown in FIG. 27(*b*) as light arrows. FIG. 27 illustrates diffraction by reflection hologram and coupling into the waveguide of an NIR 940 nm beam reflected from the eye; (b) Recording geometry of the reflection hologram with 647 nm laser beams.

FIG. 28(*a*) shows reconstruction of the hologram using a 940 nm NIR light source, while FIG. 28(*b*) shows actual recording geometry with the 647 nm light beam.

Recording with the substrate-guided reflection hologram lens is similar with an exception that a lens with a desired distance from its back focal plane to the plane of the recording photosensitive layer, corresponding to the needed distance between the viewer's eye and the hologram surface, needs to be placed in one of the recording beams. Such a lens provides a desired divergent beam in recording.

One can also have a system that simultaneously has image use and simultaneous infrared eye tracking. And have them be interactive. While such a system can be executed without image tiling, the more complicated case of executing such a system with image tiling is explained. Those of ordinary skill in the art would know how to make adaptations for untiled images, or even for systems using various display and transmission schemes as explained along with FIGS. 4 through 12.

A see-through virtual image forming system can have two or more monochrome or color display sources such as LCDs, OLEDs, or similar, two or more in-coupling substrate-guided holograms placed onto a transparent visor, flat or curved, in such a way as the images created by each display source are coupled by a corresponding input substrate-guided hologram into a transparent visor, where the above-mentioned images are transferred by means of total internal reflection towards an output hologram, which is placed on the same visor in such a way as to output both images towards the viewer's eye creating a seamless image consisting of multiple separate images generated by the display sources.

In addition, one can superimpose an infrared eye-tracking system on the virtual image forming system. In considering the interaction of the holograms it should be remembered that input or output holograms can be effectively transparent when interacting with light that does not satisfy the Bragg condition of the hologram. An additional two-coupled hologram system designed for forming and transferring an image in infrared light can have either one or more near infrared light emitting diodes illuminating the viewer's eye at one or more illumination angles. The image transmitting system can have a light input hologram (hologram lens) positioned on a transparent visor substrate. The substrate can be flat or curved, positioned in opposition to the viewer's eye at the focal distance away from the eye. The light input hologram can then capturing near infrared light reflected from the eye and transferring the near infrared image through internal reflections inside the substrate (e.g. visor) to a second, output hologram (hologram grating), placed on the transparent visor at some pre-determined location and coupled to the first one through above-mentioned internal reflections. The output hologram transfers the near infrared image of the eye to an outside miniature camera, which is placed in opposition to the output hologram and captures the image in real time, or at some pre-determined time intervals. The above-mentioned camera can be connected to a processing hardware unit, which provides processing of the obtained video information with the purpose of extracting the eye-gaze direction of the eye and its fixation point according to an algorithm known in the art, also, the system is capable of detecting pupil and saccadic movements of the eye. The system is a non-obtrusive see-through, i.e., it does not prevent the eye from seeing a full-angle scene as the eye would see without it.

Figure 29:
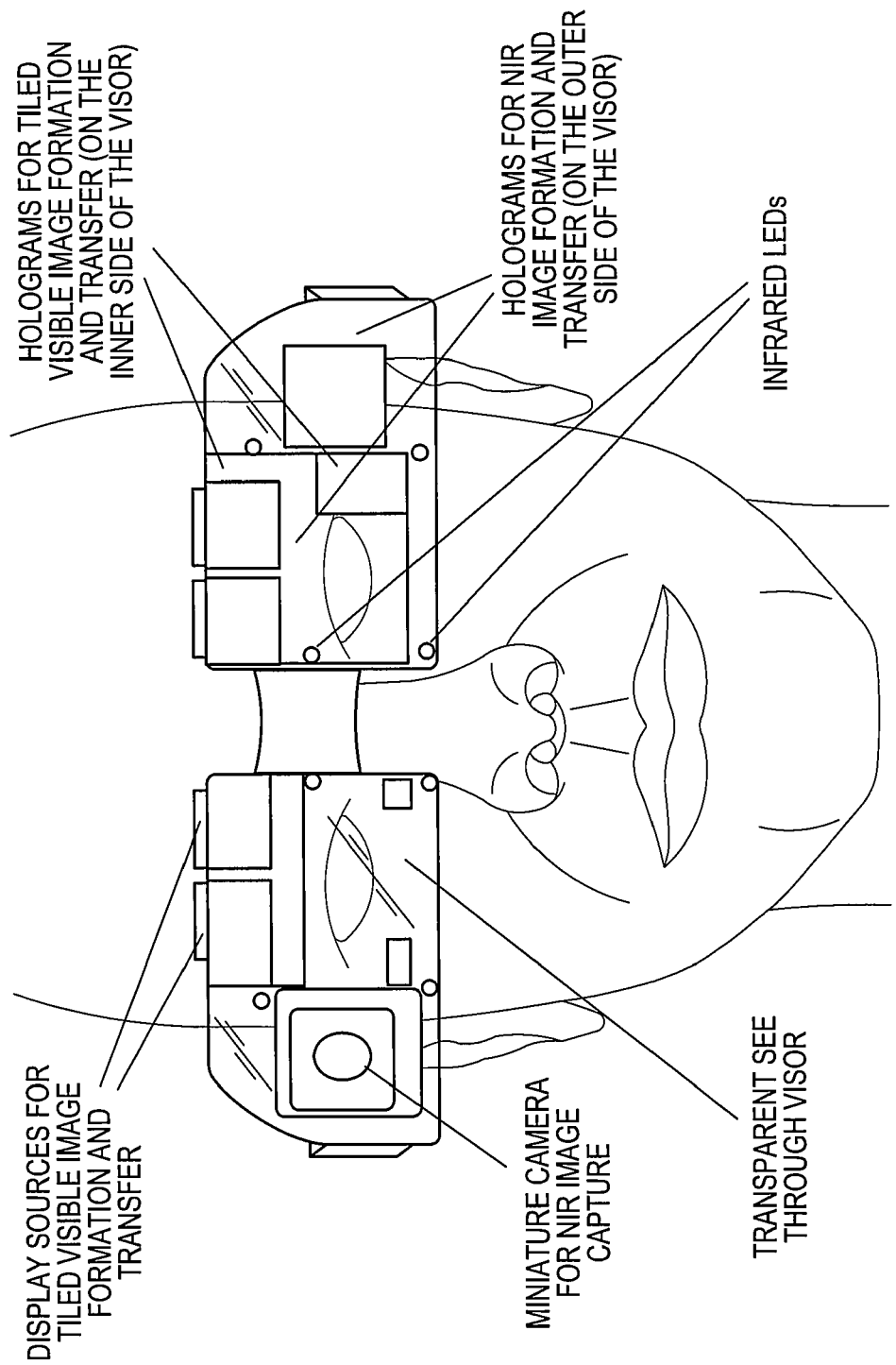
FIG. 29 diagrams an arrangement of elements for a display that also does eye tracking.
Figure 30:
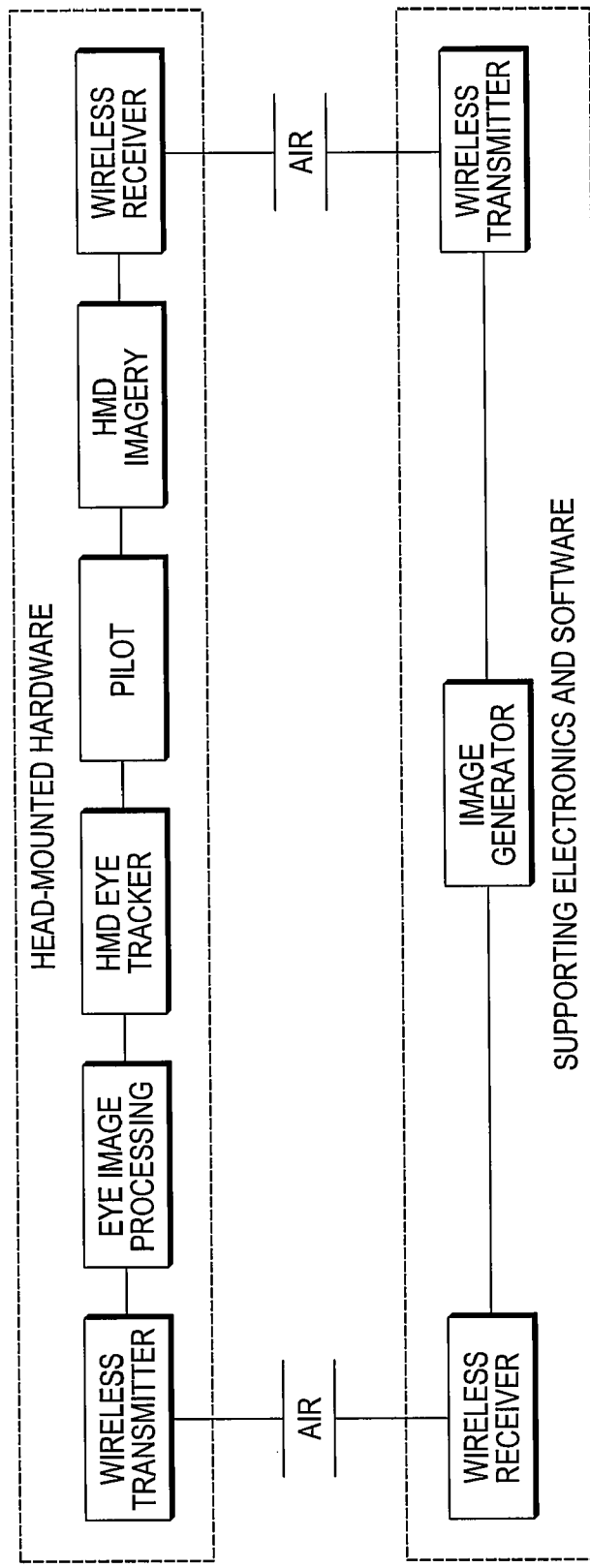
FIG. 30 is a block diagram of elements for enabling cooperation between the display function and the eye tracking function.

A system which is a superposition of the image tiling and a simultaneous infrared eye-tracking, by assembling on a transparent visor multiple holograms recorded in the visible spectrum range, and forming a virtual image display with image tiling capability as described above, and providing a means for Infrared Eye-Tracking by assembling on a transparent visor two holograms per eye recorded for NIR light, as described above. It should be understood that holograms for visible tiled image formation and transfer through the transparent visor by means of total internal reflections can operably be placed on one side of the visor, while holograms recorded for infrared image formation and transfer are placed on the opposite side of the visor, FIG. 29. Either front or back side of the visor can be chosen for placement of holograms for either NIR image formation and transfer, or for placement of holograms for a visible image formation and transfer. It is operable to place two different types of holograms (one type for visible, another one for NIR) on the opposite sides of the visor. As the two types of holograms are recorded for, correspondingly, visible and NIR spectral ranges as described above for image formation and transfer of each type (visible and NIR) through a transparent visor by means of internal reflections do not interfere with each other. FIG. 29 shows the example of arrangement on a transparent visor of display sources for tiled visible image formation and transfer, holograms for tiled visible image formation and transfer, NIR light emitting diodes (LEDs) to illuminate a viewer's eye for eye-tracking, miniature cameras for NIR image capture for eye-tracking, holograms for NIR image formation and transfer for eye-tracking.

It should be understood that a described system can be of a simplified type, when a single display source is used for generating visible image (no image tiling option). The described system can be used in such applications as gaze-contingent displays using foveal imaging, or for monitoring human cognitive capabilities by simultaneously tracking the eye and providing some test information for it, or in similar applications.

The foregoing it will be observed that numerous modifications and variations can be effectuated without departing from the true spirit and scope of the novel concepts of the present invention. It is to be understood that no limitation with respect to the specific embodiment illustrated is intended or should be inferred. The disclosure is intended to cover by the appended claims all such modifications as fall within the scope of the claims. All of the references that follow are incorporated by reference as if set forth fully herein.

The invention claimed is:

1. A holographic substrate-guided wave based see through display comprising:
   a light source positioned to illuminate a reflective area;
   a single transparent substrate;
   a transparent first holographic lens laminated to the substrate on an exterior side of the substrate and accepting light reflected by the reflective area in the form of an image of the reflective area, and diffracting the accepted light in single diffraction order;
   the substrate, being elongate and having a thickness and a length accepting the light diffracted by the transparent first holographic lens at a second location on the exterior side that is transparent through its thickness, and transmitting the light accepted at the second location along the length of the substrate by total internal reflection to a first location on the exterior side spaced from the second location along the length of the substrate, the substrate transmitting the light accepted at the second location from the first location;
   a transparent second holographic lens laminated to the exterior side of the substrate spaced from the second location and accepting the light transmitted from the substrate at the first location and diffracting it in single diffraction order at different angles to a location outside of the second holographic lens as a viewable image of the reflective area;
   a camera accepting the viewable image of the reflective area from the second holographic optical element, and capturing the viewable image of the reflective area,
   wherein the apparatus is transparent in the direction of the thickness at the second location to have a see-through display;
   a microdisplay, emitting light in the form of a microdisplay image;
   a third holographic lens accepting the emitted light in the form of the microdisplay image from the microdisplay, and diffracting the accepted light in a single diffraction order;
   the substrate having a third location accepting the light diffracted from the third holographic lens and transmitting the light accepted at the third location along the length of the substrate by internal reflection to a fourth location, the substrate being transparent through the thickness at the fourth location and transmitting the light accepted at the third location from the fourth location; and
   a fourth holographic lens accepting the light transmitted by the substrate at the fourth location diffracting the accepted light in single diffraction order and transmitting it to the reflective area, as a viewable image of the microdisplay,
   wherein the display is transparent in a direction through the thickness of the substrate at the fourth location and at least one of the third holographic lens and fourth holographic lens has optical power.

* * * * *